US012510909B2

(12) United States Patent
Sayed et al.

(10) Patent No.: US 12,510,909 B2
(45) Date of Patent: Dec. 30, 2025

(54) FAST SETTLED AND TRANSIENT LOW DROPOUT (LDO) REGULATOR

(71) Applicant: QUALCOMM Incorporated, San Diego, CA (US)

(72) Inventors: Mohammad Wasim Sayed, Bangalore (IN); Raghav Gupta, Bangalore (IN); Rakesh Kumar Sinha, Bangalore (IN); Burcin Serter Ergun, Poway, CA (US); Ashwith Jerome Rego, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 184 days.

(21) Appl. No.: 18/594,452

(22) Filed: Mar. 4, 2024

(65) Prior Publication Data

US 2025/0278104 A1 Sep. 4, 2025

(51) Int. Cl.
*G05F 1/575* (2006.01)
*G05F 1/46* (2006.01)
*G05F 1/565* (2006.01)

(52) U.S. Cl.
CPC .............. *G05F 1/575* (2013.01); *G05F 1/468* (2013.01); *G05F 1/565* (2013.01)

(58) Field of Classification Search
CPC ........... G05F 1/575; G05F 1/468; G05F 1/565
See application file for complete search history.

(56) References Cited

U.S. PATENT DOCUMENTS

| | | | | | |
|---|---|---|---|---|---|
| 6,320,454 | B1 * | 11/2001 | Pathak | G05F 1/465 327/535 |
| 9,778,672 | B1 * | 10/2017 | Gao | G05F 1/575 |
| 10,133,289 | B1 * | 11/2018 | Ankamreddi | G05F 1/575 |
| 10,423,178 | B1 * | 9/2019 | Chen | G05F 1/56 |
| 11,277,140 | B1 * | 3/2022 | Park | H03L 7/081 |
| 11,373,572 | B2 * | 6/2022 | Lee | G09G 3/20 |
| 2009/0184751 | A1 * | 7/2009 | Park | G05F 1/563 327/535 |
| 2011/0187336 | A1 * | 8/2011 | Wu | G05F 1/10 323/282 |
| 2013/0076325 | A1 * | 3/2013 | Liu | G05F 1/575 323/280 |
| 2014/0097816 | A1 * | 4/2014 | Chen | G05F 1/468 323/283 |
| 2014/0312867 | A1 * | 10/2014 | Pulvirenti | G05F 1/56 323/280 |

(Continued)

*Primary Examiner* — Yusef A Ahmed
(74) *Attorney, Agent, or Firm* — Loza & Loza, LLP

(57) ABSTRACT

A voltage regulator includes a pass transistor coupled between an input and an output of the voltage regulator, and an amplifier having a first input configured to receive a reference voltage, and a second input coupled to the output of the voltage regulator via a feedback path. The voltage regulator also includes a voltage booster coupled between an output of the amplifier and a gate of the pass transistor, and a multiplexer having a first input configured to receive a first clock signal, a second input configured to receive a second clock signal having a higher frequency than the first clock signal, and an output coupled to a clock input of the voltage booster. The voltage regulator also includes a detection circuit having an input coupled to the amplifier, and an output coupled to a select input of the multiplexer.

14 Claims, 20 Drawing Sheets

(56) References Cited

U.S. PATENT DOCUMENTS

| | | | | |
|---|---|---|---|---|
| 2015/0198959 | A1* | 7/2015 | Kuttner | H03F 3/45071 323/273 |
| 2016/0124447 | A1* | 5/2016 | Kobayashi | G05F 1/575 323/280 |
| 2016/0226378 | A1* | 8/2016 | Suzuki | G05F 1/565 |
| 2018/0091044 | A1* | 3/2018 | Salem | H02M 3/07 |
| 2018/0198416 | A1* | 7/2018 | Hur | H03F 3/2171 |
| 2021/0124383 | A1* | 4/2021 | Iguchi | G05F 1/565 |
| 2021/0255654 | A1* | 8/2021 | Chan | G05F 1/575 |
| 2021/0405674 | A1* | 12/2021 | Xue | G05F 1/575 |
| 2022/0147082 | A1* | 5/2022 | Melanson | G05F 1/565 |
| 2023/0205246 | A1* | 6/2023 | Roh | G05F 1/56 |
| 2023/0221744 | A1* | 7/2023 | Pande | H02M 3/07 323/234 |
| 2023/0238873 | A1* | 7/2023 | Pasotti | H02M 3/073 323/273 |
| 2025/0060768 | A1* | 2/2025 | Wang | G05F 1/56 |

* cited by examiner

FAST SETTLED AND TRANSIENT LOW DROPOUT (LDO) REGULATOR

BACKGROUND

Field

Aspects of the present disclosure relate generally to voltage regulators, and more particularly, to low dropout (LDO) regulators.

Background

Voltage regulators are used in a variety of systems to provide regulated voltages to power circuits in the systems. A commonly used voltage regulator is a low dropout (LDO) regulator. An LDO regulator typically includes a pass transistor and an amplifier coupled in a feedback loop to maintain an approximately constant output voltage based on a reference voltage.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to a voltage regulator. The voltage regulator includes a pass transistor coupled between an input of the voltage regulator and an output of the voltage regulator. The voltage regulator also includes an amplifier having a first input, a second input, and an output, wherein the first input of the amplifier is configured to receive a reference voltage, and the second input of the amplifier is coupled to the output of the voltage regulator via a feedback path. The voltage regulator also includes a voltage booster coupled between the output of the amplifier and a gate of the pass transistor, and a multiplexer having a first input, a second input, an output, and a select input, wherein the first input of the multiplexer is configured to receive a first clock signal, the second input of the multiplexer is configured to receive a second clock signal having a higher frequency than the first clock signal, and the output of the multiplexer is coupled to a clock input of the voltage booster. The voltage regulator also includes a detection circuit having an input and an output, wherein the input of the detection circuit is coupled to the amplifier, and the output of the detection circuit is coupled to the select input of the multiplexer.

A second aspect relates to a method of operating a voltage regulator. The voltage regulator includes a pass transistor, an amplifier, and a voltage booster coupled between an output of the amplifier and a gate of the pass transistor, wherein a first input of the amplifier receives a reference voltage and a second input of the amplifier receives a feedback voltage via a feedback path coupled to a source of the pass transistor. The method includes detecting a difference between the reference voltage and the feedback voltage is greater than a threshold voltage, and switching a clock input of the voltage booster from a first clock signal to a second clock signal in response to detecting the difference between the reference voltage and the feedback voltage is greater than the threshold, wherein the second clock signal has a higher clock frequency than the first clock signal.

A third aspect relates to a voltage regulator. The voltage regulator includes a pass transistor coupled between an input of the voltage regulator and an output of the voltage regulator, and an amplifier having a first input, a second input, and an output, wherein the first input of the amplifier is configured to receive a reference voltage, and the second input of the amplifier is coupled to the output of the voltage regulator via a feedback path. The voltage regulator also includes a voltage booster coupled between the output of the amplifier and a gate of the pass transistor, wherein the voltage booster includes a boost capacitor and an output capacitor, and the output capacitor is coupled to the gate of the pass transistor. The voltage booster is configured to, during a first phase, charge the boost capacitor with current from the output of the amplifier, and, during a second phase, boost a voltage on the boost capacitor and transfer charge from the boost capacitor to the output capacitor. The voltage regulator also includes a capacitance controller configured to switch the boost capacitor between a first capacitance and a second capacitance higher than the first capacitance, and a detection circuit having an input and an output, wherein the input of the detection circuit is coupled to the amplifier, and the output of the detection circuit is coupled to the capacitance controller.

A fourth aspect relates to a method of operating a voltage regulator. The voltage regulator includes a pass transistor, an amplifier, and a voltage booster coupled between an output of the amplifier and a gate of the pass transistor, wherein a first input of the amplifier receives a reference voltage and a second input of the amplifier receives a feedback voltage via a feedback path coupled to a source of the pass transistor. The method includes detecting a difference between the reference voltage and the feedback voltage is greater than a threshold voltage, and switching a boost capacitor of the voltage booster from a first capacitance to a second capacitance in response to detecting the difference between the reference voltage and the feedback voltage is greater than the threshold, wherein the second capacitance is higher than the first capacitance.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
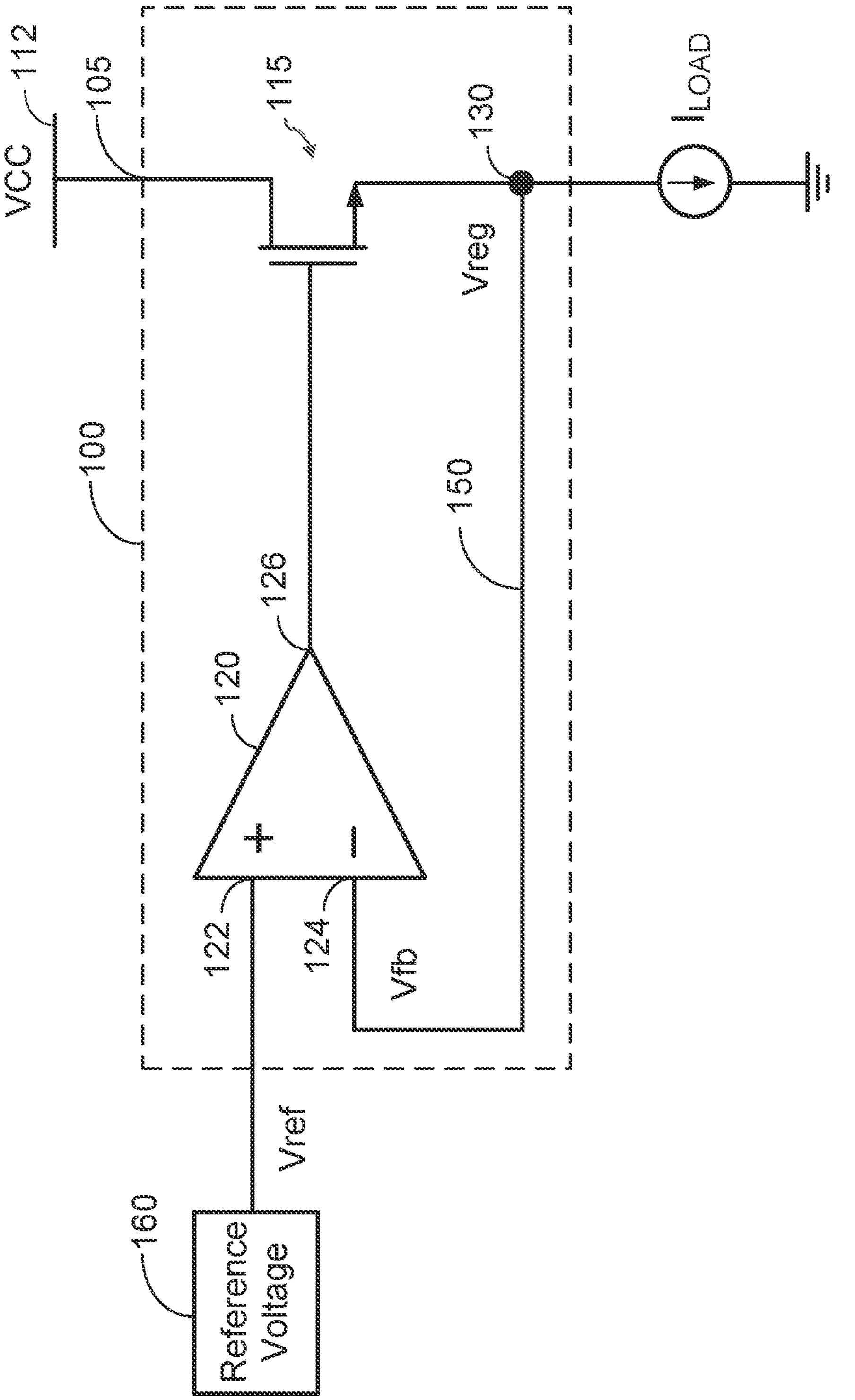
FIG. 1 shows an example of a low dropout (LDO) regulator.

FIG. 1 shows an example of a low dropout (LDO) regulator 100 according to certain aspects of the present disclosure. The LDO regulator 100 may be used to provide a noise-sensitive circuit (not shown) with a clean regulated voltage from a noisy supply voltage VCC. The supply voltage VCC may come from a switching regulator (not shown) configured to convert a voltage of a battery into the supply voltage or may come from another voltage source.

The LDO regulator 100 includes a pass n-type field effect transistor (NFET) 115 and an amplifier 120 (also referred to as an error amplifier). The pass NFET 115 has a drain coupled to the input 105 of the LDO regulator 100, a gate coupled to the output 126 of the amplifier 120, and a source coupled to the output 130 of the LDO regulator 100. The input 105 of the LDO regulator 100 is coupled to a voltage supply rail 112 configured to provide the supply voltage VCC. In FIG. 1, the current source labeled "$I_{LOAD}$" represents the load current of a circuit (not shown) coupled to the output 130 of the LDO regulator 100.

The amplifier 120 is configured to control the resistance of the pass NFET 115 between the input 105 and the output 130 of the LDO regulator 100 by adjusting the gate voltage of the pass NFET 115. For example, the amplifier 120 may increase the resistance of the pass NFET 115 by decreasing the gate voltage of the pass NFET 115, and decrease the resistance of the pass NFET 115 by increasing the gate voltage of the pass NFET 115.

In this example, a reference voltage (denoted "Vref") is input to a first input 122 (e.g., plus input) of the amplifier 120. The reference voltage is generated by a reference circuit 160 coupled to the first input 122 of the amplifier 120. The reference voltage may be implemented with a voltage divider, a bandgap circuit, a circuit including a current source and a resistor coupled in series, or any combination thereof.

A second input 124 (e.g., minus input) of the amplifier 120 is coupled to the output 130 of the LDO regulator 100 via a feedback path 150. In this example, the regulated voltage Vreg at the output 130 of the LDO regulator 100 is fed back to the second input 124 of the amplifier 120 via the feedback path 150 to provide a feedback voltage (denoted "Vfb") at the second input 124 of the amplifier 120. In the example shown in FIG. 1, the feedback voltage Vfb is approximately equal to the regulated voltage Vreg. However, it is to be appreciated that the present disclosure is not limited to this example, as discussed further below.

During operation, the output 126 of the amplifier 120 drives the gate of the pass NFET 115 in a direction that reduces the difference (i.e., error) between the reference voltage Vref and the feedback voltage Vfb. Since the feedback voltage Vfb is approximately equal to the regulated voltage Vreg in this example, the amplifier 120 drives the gate of the pass NFET 115 in a direction that causes the regulated voltage Vreg to be approximately equal to the reference voltage Vref.

Figure 2:
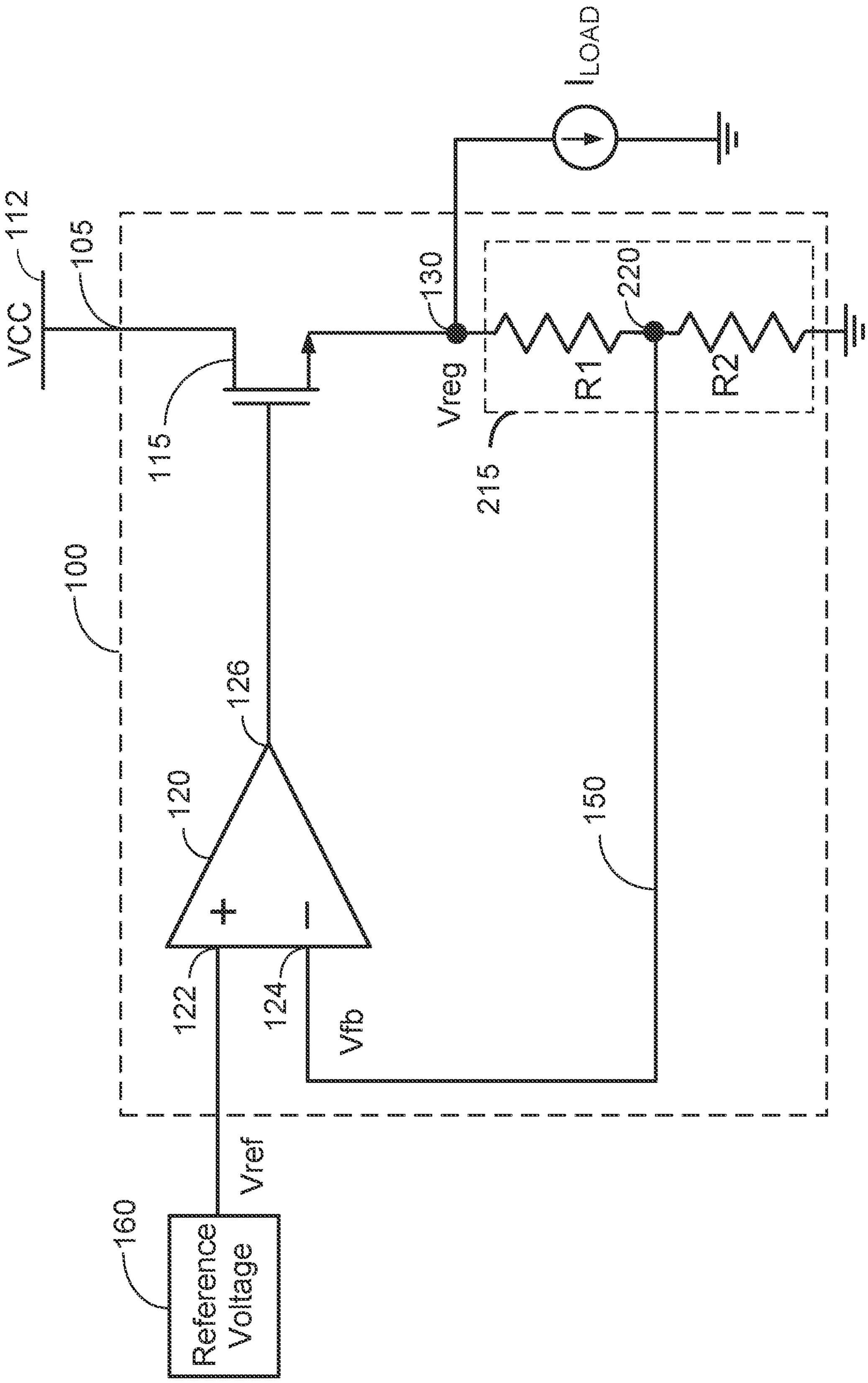
FIG. 2 shows an example of an LDO regulator including a voltage divider in a feedback path.

In the example in FIG. 1, the regulated voltage Vreg is fed directly to the second input 124 of the amplifier 120. However, it is to be appreciated that the present disclosure is not limited to this example. For example, FIG. 2 shows another example of the LDO regulator 100, in which the regulated voltage Vref is fed back to the amplifier 120 through a voltage divider 215. The voltage divider 215 includes a first resistor R1 and a second resistor R2 coupled in series between the output 130 of the LDO regulator 100 and ground (or some reference potential). In this example, the second input 124 of the amplifier 120 is coupled to a node 220 between the resistors R1 and R2. Thus, in this example, the feedback path 150 between the output 130 of the LDO regulator 100 and the second input 124 of the amplifier 120 includes the voltage divider 215. In this example, the feedback voltage Vfb is related to the regulated voltage Vreg as follows:

$$Vfb = \left(\frac{R2}{R1 + R2}\right) \cdot Vreg \quad (1)$$

where R1 and R2 in equation (1) are the resistances of resistors R1 and R2, respectively. Thus, in this example, the feedback voltage Vfb is proportional to the regulated voltage Vreg, in which the proportionality is set by the ratio of the resistances of resistors R1 and R2.

The amplifier 120 drives the gate of the pass NFET 115 in a direction that reduces the difference (i.e., error) between the feedback voltage Vfb and reference voltage Vref. This feedback causes the regulated voltage Vreg to be approximately equal to:

$$Vreg = \left(1 + \frac{R1}{R2}\right) \cdot Vref. \quad (2)$$

As shown in equation (2), in this example, the regulated voltage Vreg may be set to a desired voltage by setting the ratio of the resistances of resistors R1 and R2 accordingly. Therefore, in the present disclosure, it is to be appreciated that the feedback voltage Vfb may be proportional to the regulated voltage Vreg.

In the examples in FIGS. 1 and 2, the pass NFET 115 implements the pass transistor of the LDO regulator 100 regulator. The pass NFET 115 may be fabricated using a planar process, a FinFET process, and/or another fabrication process. Implementing the pass transistor of the LDO regulator 100 with the pass NFET 115 has several advantages over implementing the pass transistor with a p-type field effect transistor (PFET). One advantage is that the relatively low impedance of the pass NFET 115 at the output 130 of the LDO regulator 100 helps prevent a low-frequency pole from forming at the output 130. This may eliminate the need for a large compensation capacitor at the output 130. In addition, this may make the stability of the loop substantially independent of the load. Further, an NFET based LDO regulator may have better power supply rejection ratio (PSRR), low output ripple, and high stability.

However, a challenge with using the pass NFET 115 for the pass transistor of the LDO regulator 100 is that the gate voltage of the pass NFET 115 needs to be above the regulated voltage Vreg by at least the threshold voltage of the pass NFET 115 in order for the pass NFET 115 to turn on. In cases where the amplifier 120 is powered by the supply voltage VCC, the maximum voltage that the amplifier 120 is able to output to the gate of the pass NFET 115 may be approximately VCC. In these cases, the maximum regulated voltage Vreg at the output 130 of the LDO regulator 100 is limited to a voltage approximately equal to the supply voltage VCC minus the threshold voltage of the pass NFET 115. This prevents the regulated voltage Vreg from being set close to the supply voltage VCC.

Figure 3:
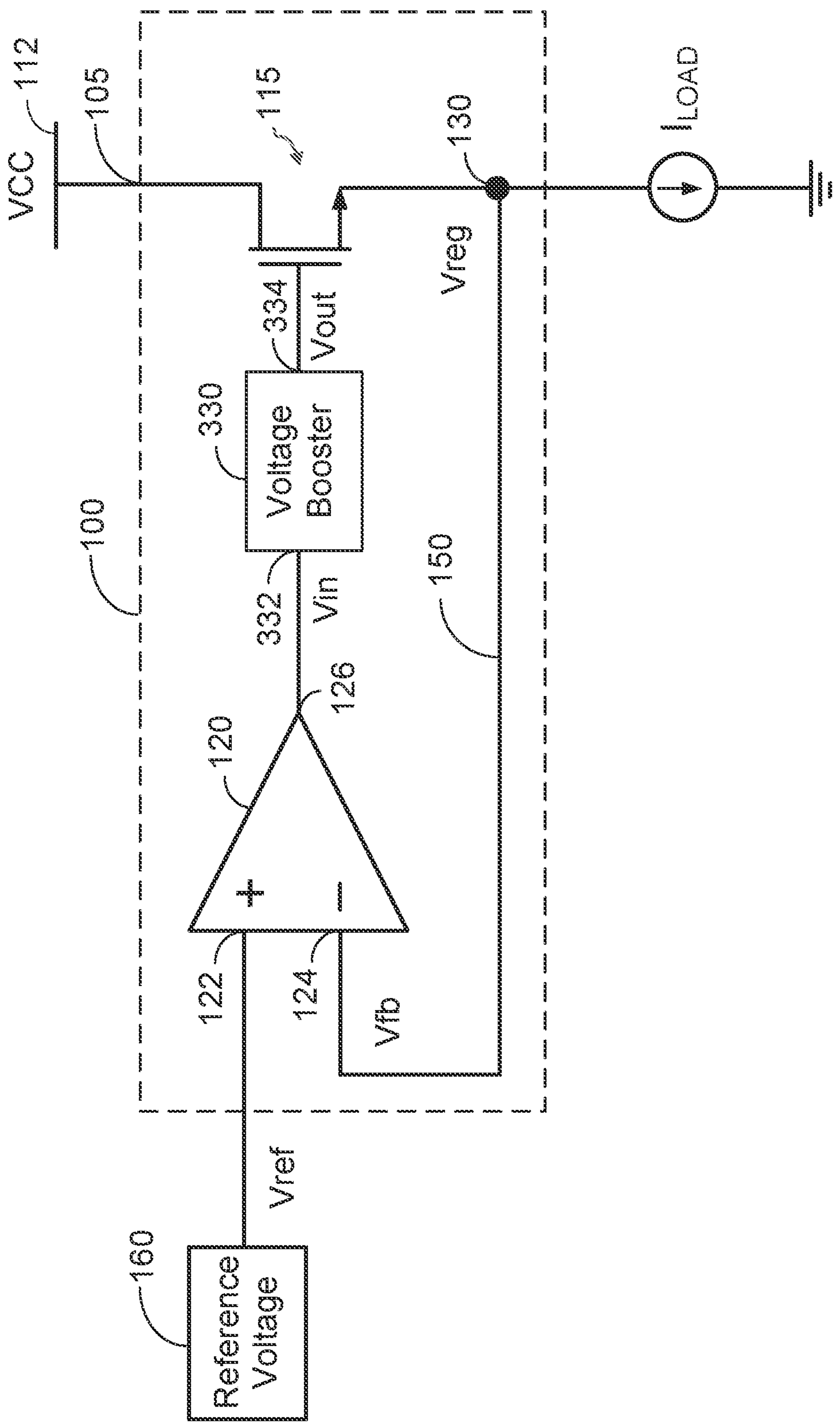
FIG. 3 shows an example of an LDO regulator including a voltage booster according to certain aspects of the present disclosure.

One approach to raise the regulated voltage Vreg closer to the supply voltage VCC is to boost the voltage at the output 126 of the amplifier 120 and apply the boosted voltage to the gate of the pass NFET 115. In this regard, FIG. 3 shows an example where the LDO regulator 100 includes a voltage booster 330 coupled between the output 126 of the amplifier 120 and the gate of the pass NFET 115. The voltage booster 330 has an input 332 coupled to the output 126 of the amplifier 120, and an output 334 coupled to the gate of the pass NFET 115. The input 332 may also be referred to as a boost input.

The voltage booster 330 is configured to receive the output voltage of the amplifier 120 at the input 332 of the voltage booster 330 (denoted "Vin"), boost (i.e., increase) the output voltage of the amplifier 120 to generate a boosted voltage, and output the boosted voltage at the output 334 of the voltage booster 330 (denoted "Vout"). For example, the voltage booster 330 may be configured to double the voltage at the output 126 of the amplifier 120. In this example, the voltage booster 330 may be referred to as a voltage doubler. The boosted voltage at the gate of the pass NFET 115 may exceed the supply voltage VCC, allowing the LDO regulator 100 to set the regulated voltage Vreg closer to the supply voltage VCC and reduce the dropout voltage across the pass NFET 115.

In the example in FIG. 3, the regulated voltage Vreg is fed directly to the second input 124 of the amplifier 120 via feedback path 150. However, it is to be appreciated that the present disclosure is not limited to this example. For example, in some implementations, the feedback path 150 may include the voltage divider 215 shown in FIG. 2, in which case the feedback voltage Vfb is proportional to the regulated voltage Vreg based on the ratio of the resistances of the resistors R1 and R2, as discussed above.

Figure 4:
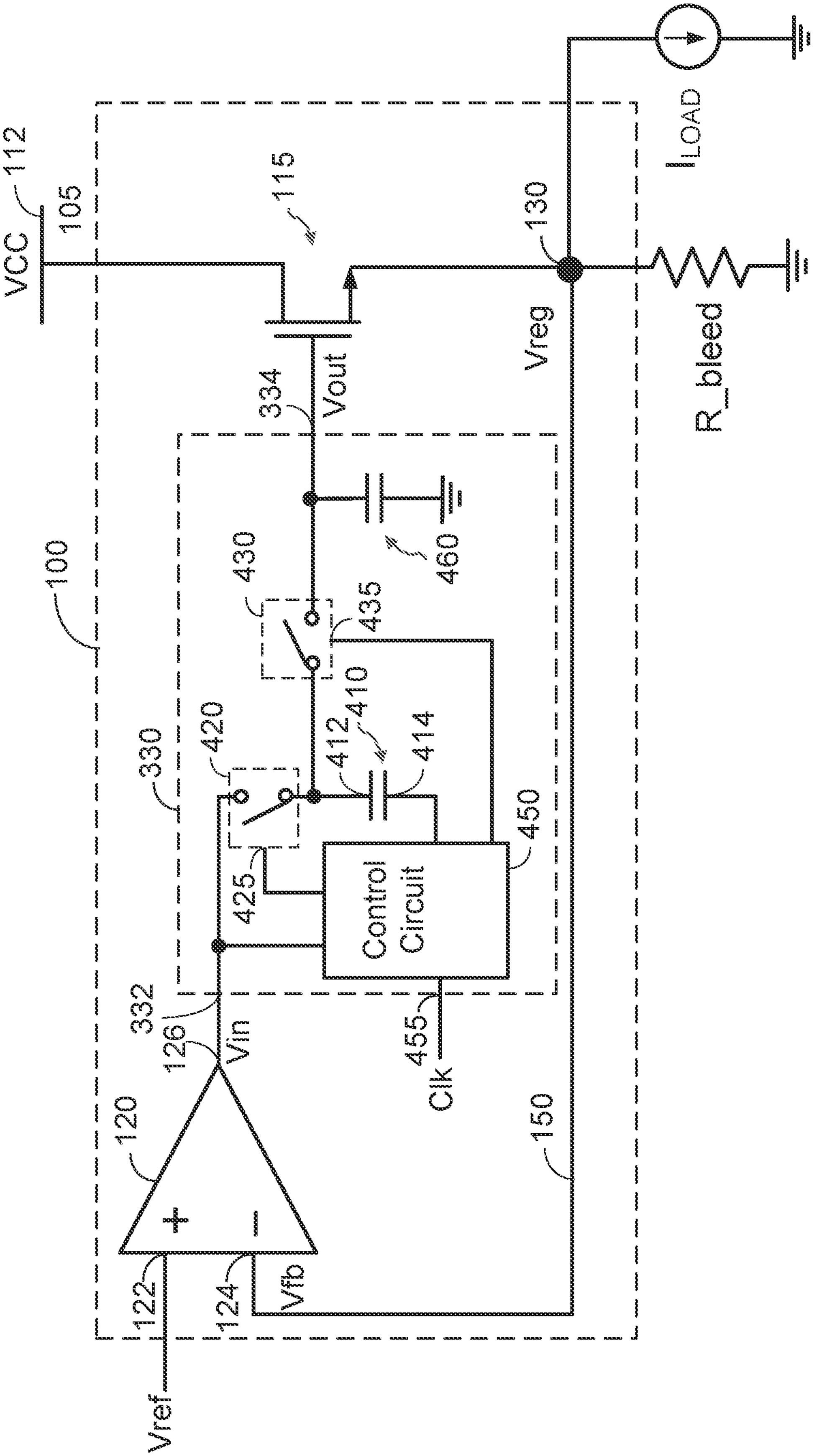
FIG. 4 shows an exemplary implementation of the voltage booster according to certain aspects of the present disclosure.

The voltage booster 330 may be implemented with a charge pump or another type of circuit. In this regard, FIG. 4 shows an example in which the voltage booster 330 is implemented with a charge pump including a first switch 420, a second switch 430, a capacitor 410, a control circuit 450, and an output capacitor 460. As discussed further below, the control circuit 450 controls the on/off states of the switches 420 and 430 via respective control inputs 425 and 435. As used herein, a "control input" of a switch is an input that controls whether the switch is closed or open based on a signal (e.g., voltage) input to the control input. Each of the switches 420 and 430 may be implemented with a transistor, a transmission gate, or another type of switch. For the example of a switch implemented with a respective transistor, the respective control input corresponds to the gate of the respective transistor.

In this example, the first switch 420 is coupled between the input 332 of the voltage booster 330 and a first terminal 412 of the capacitor 410, and the second switch 430 is coupled between the first terminal 412 of the capacitor 410 and the output 334 of the voltage booster 330. The control circuit 450 is coupled to a second terminal 414 of the capacitor 410. As discussed further below, the control circuit 450 controls the voltage applied to the second terminal 414 of the capacitor 410. The output capacitor 460 may be coupled between the output 334 of the voltage booster 330 and ground. The output capacitor 460 may include multiple capacitors (e.g., coupled in parallel and/or another configuration).

In operation, the control circuit 450 receives a clock signal Clk at a clock input 455, and times operations of the voltage booster 330 based on the clock signal Clk. The clock signal Clk may come from a phase locked loop (PLL) or another type of clock generator. During each period (i.e., cycle) of the clock signal Clk, the control circuit 450 charges the capacitor 410 during a charge phase (e.g., first portion of the clock period), and transfers charge between the capacitor 410 to the output capacitor 460 during a transfer phase (e.g., second portion of the clock period).

During the charge phase, the control circuit 450 turns on the first switch 420, turns off the second switch 430, and couples the second terminal 414 of the capacitor 410 to ground (i.e., 0V). This allows charge to flow from the output 126 of the amplifier 120 to the first terminal 412 of the capacitor 410 through the first switch 420, charging the first terminal 412 of the capacitor 410 to the input voltage Vin.

During the transfer phase, the control circuit 450 turns off the first switch 420, turns on the second switch 430, and couples the voltage Vin at the input 332 to the second terminal 414 of the capacitor 410. The voltage Vin at the second terminal 414 of the capacitor 410 boosts the voltage at the first terminal 412 of the capacitor 410 to a voltage of 2Vin (i.e., double the input voltage Vin). The turning on of the second switch 430 allows the transfer of charge between the capacitor 410 and the output capacitor 460 through the second switch 430. In the steady-state condition, the output voltage Vout is approximately equal to 2Vin in this example.

In the example discussed above, the control circuit 450 applies a voltage of Vin to the second terminal 414 of the capacitor 410 to boost at the voltage at the first terminal 412 of the capacitor 410 to 2Vin. However, it is to be appreciated that the present disclosure is not limited to this example. In general, the control circuit 450 applies a boost voltage to the second terminal 414 of the capacitor 410 during the transfer phase to boost the voltage at the first terminal 412 of the capacitor 410 to Vin plus the boost voltage. In the above example, the boost voltage is Vin.

In the example shown in FIG. 4, a bleed resistor R_bleed is coupled between the output 130 of the LDO regulator 100 and ground. In this example, the bleed resistor R_bleed is configured to draw a small quiescent current that allows the LDO regulator 100 to maintain voltage regulation when the load current is zero or close to zero. It is to be appreciated that the bleed resistor R_bleed may be omitted in some implementations.

Figure 5:
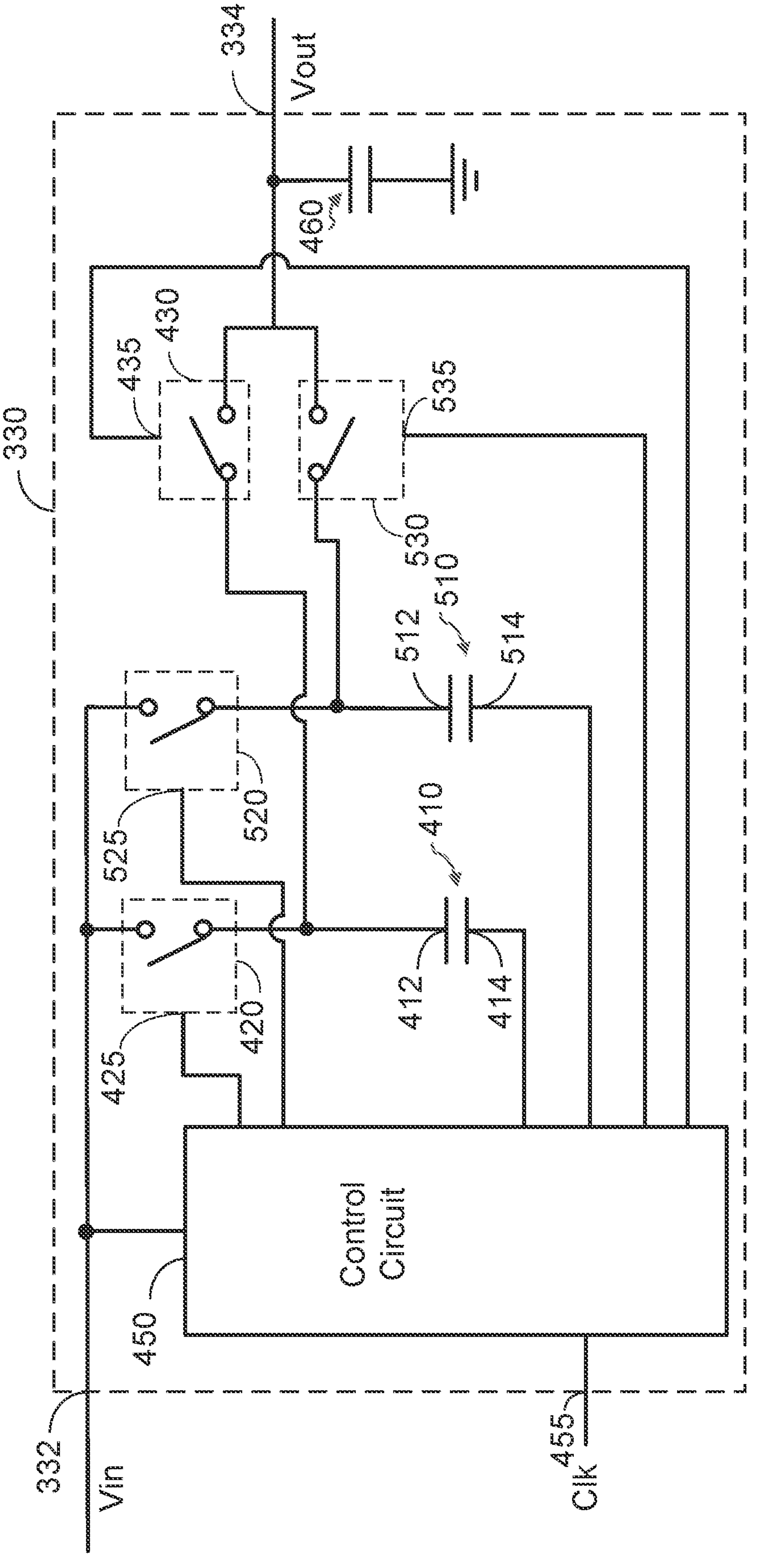
FIG. 5 shows an exemplary implementation of the voltage booster employing double charge pumping according to certain aspects of the present disclosure.

FIG. 5 shows an example in which the voltage booster 330 employs a double charge pumping architecture according to certain aspects. In this example, charge pumping is performed twice per period (i.e., cycle) of the clock signal Clk using two capacitors, as discussed further below.

In this example, the voltage booster 330 includes the first switch 420, the second switch 430, the capacitor 410, and the control circuit 450 discussed above. In addition, the voltage booster 330 includes a third switch 520, a fourth switch 530, and a second capacitor 510. In the discussion below, the capacitor 410 is referred to as the first capacitor.

The third switch 520 is coupled between the input 332 of the voltage booster 330 and a first terminal 512 of the second capacitor 510, and the fourth switch 530 is coupled between first terminal 512 of the second capacitor 510 and the output 334 of the voltage booster 330. The control circuit 450 is coupled to a second terminal 514 of the second capacitor 510. In the example shown in FIG. 5, the control input 425 of the first switch 420 and the control input 525 of the third switch 520 are coupled to the control circuit 450. The control input 435 of the second switch 430 may be coupled to the control circuit 450 (shown in the example in FIG. 5) or coupled to the first terminal 512 of the second capacitor 510. The control input 535 of the fourth switch 530 may be coupled to the control circuit 450 (shown in the example in FIG. 5) or coupled to the first terminal 412 of the first capacitor 410.

In operation, the control circuit 450 receives the clock signal Clk at the clock input 455, and times operations of the voltage booster 330 based on the clock signal Clk. During each period (i.e., cycle) of the clock signal Clk, the control circuit 450 charges the first capacitor 410 and transfers charge between the second capacitor 510 and the output capacitor 460 during a first portion of the clock period, and charges the second capacitor 510 and transfers charge between the first capacitor 410 and the output capacitor 460 during a second portion of the clock period.

More particularly, during the first portion of the clock period, the control circuit 450 turns on the first switch 420, turns off the second switch 430, and couples the second terminal 414 of the first capacitor 410 to ground (i.e., 0V). This allows the amplifier 120 to charge the first terminal 412 of the first capacitor 410 to the input voltage Vin through the first switch 420. Also, during the first portion of the clock period, the control circuit 450 turns off the third switch 520, turns on the fourth switch 530, and couples the second terminal 514 of the second capacitor 510 to the boost voltage (e.g., Vin) to boost the voltage at the first terminal 512 of the second capacitor 510. Alternately, the fourth switch 530 may be turned on by the voltage at the first terminal 412 of the first capacitor 410, as discussed further below with reference to FIG. 6. The turning on of the fourth switch 530 allows the transfer of charge between the first terminal 512 of the second capacitor 510 and the output capacitor 460.

During the second portion of the clock period, the control circuit 450 turns off the first switch 420, turns on the second switch 430, and couples the second terminal 414 of the first capacitor 410 to the boost voltage (e.g., Vin) to boost the voltage at the first terminal 412 of the first capacitor 410. Alternately, the second switch 430 may be turned on by the voltage at the first terminal 512 of the second capacitor 510, as discussed further below with reference to FIG. 6. The turning on of the second switch 430 allows the transfer of charge between the first terminal 412 of the first capacitor 410 and the output capacitor 460. Also, during the second portion of the clock period, the control circuit 450 turns on the third switch 520, turns off the fourth switch 530, and couples the second terminal 514 of the second capacitor 510 to ground (i.e., 0V). This allows the amplifier 120 to charge the first terminal 512 of the second capacitor 510 to the input voltage Vin through the third switch 520.

Thus, in this example, the voltage booster 330 alternately charges the first capacitor 410 and the second capacitor 510 to the input voltage Vin. The voltage booster 330 also alternately transfers charge between the first capacitor 410 and the output capacitor 460 and between the second capacitor 510 and the output capacitor 460. This allows the voltage booster 330 to perform two charge pump operations per clock period (i.e., cycle) using the capacitor 410 and the second capacitor 510.

Figure 6:
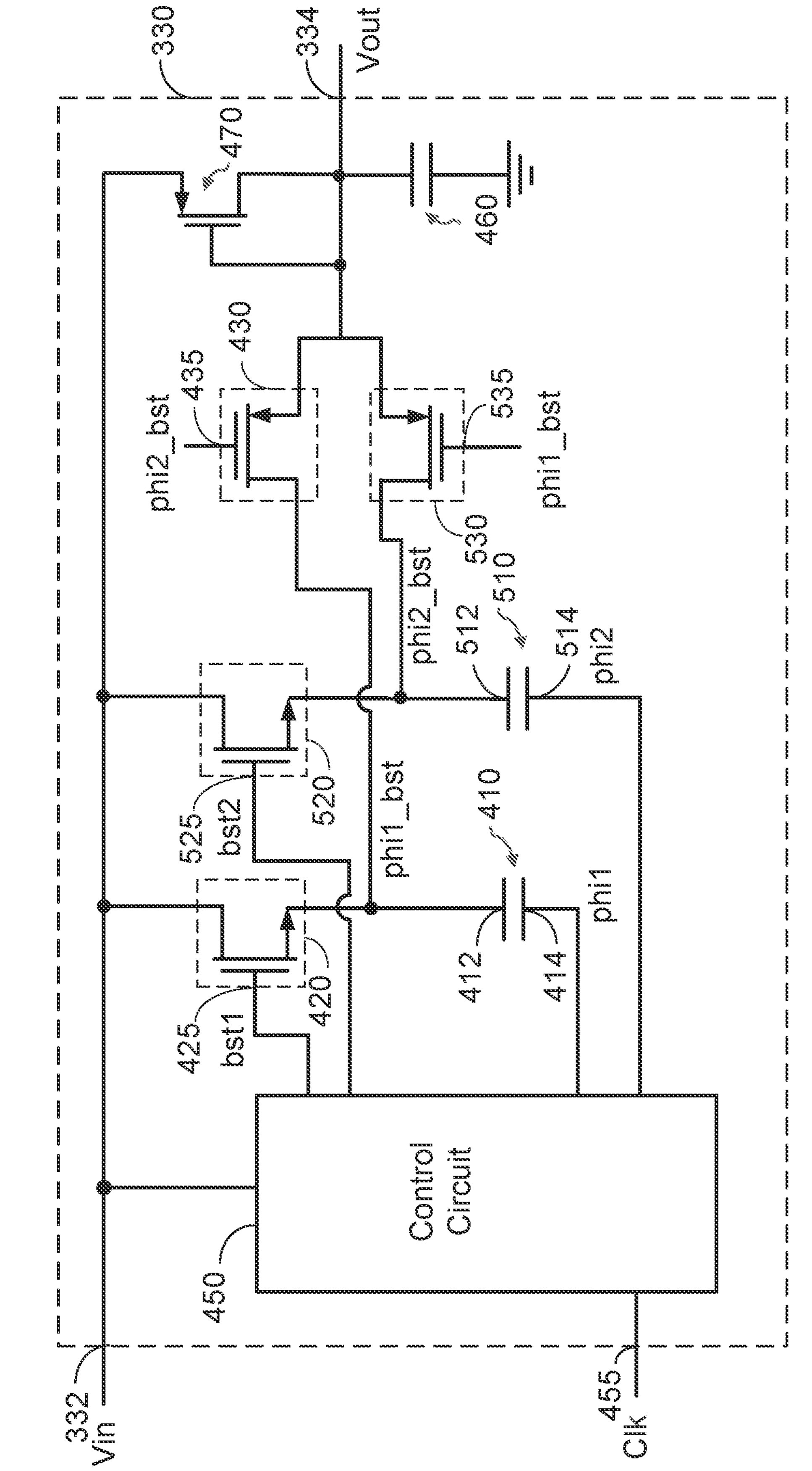
FIG. 6 shows an exemplary implementation of switches in the voltage booster of FIG. 5 according to certain aspects of the present disclosure.

FIG. 6 shows an exemplary implementation of the first switch 420, the second switch 430, the third switch 520, and the fourth switch 530. In this example, the first switch 420 is implemented with a first n-type field effect transistor (NFET), in which control input 425 of the first switch 420 (located at the gate of the first NFET) receives the control signal bst1 from the control circuit 450. The third switch 520 is implemented with a second NFET, in which control input 525 of the third switch 520 (located at the gate of the second NFET) receives the control signal bst2 from the control circuit 450.

In this example, the second switch 430 is implemented with a first p-type field effect transistor (PFET), in which the control input 435 of the second switch 430 (located at the gate of the first PFET) is coupled to the first terminal 512 of the second capacitor 510. The voltage at the first terminal 512 of the second capacitor 510 is labeled "phi2_*bst*" in FIG. 6. For ease of illustration, the connection between the control input 435 of the second switch 430 and the first terminal 512 of the second capacitor 510 is not shown in FIG. 6.

The fourth switch 530 is implemented with a second PFET, in which the control input 535 of the fourth switch 530 (located at the gate of the second PFET) is coupled to the first terminal 412 of the first capacitor 410. The voltage at the first terminal 412 of the first capacitor 410 is labeled "phi1_*bst*" in FIG. 6. For ease of illustration, the connection between the control input 535 of the fourth switch 530 and the first terminal 412 of the first capacitor 410 is not shown in FIG. 6.

In FIG. 6, the control circuit 450 outputs the control signal phi1 to the second terminal 414 of the first capacitor 410 and outputs the control signal phi2 to the second terminal 514 of the second capacitor 510, as discussed further below.

Figure 7:
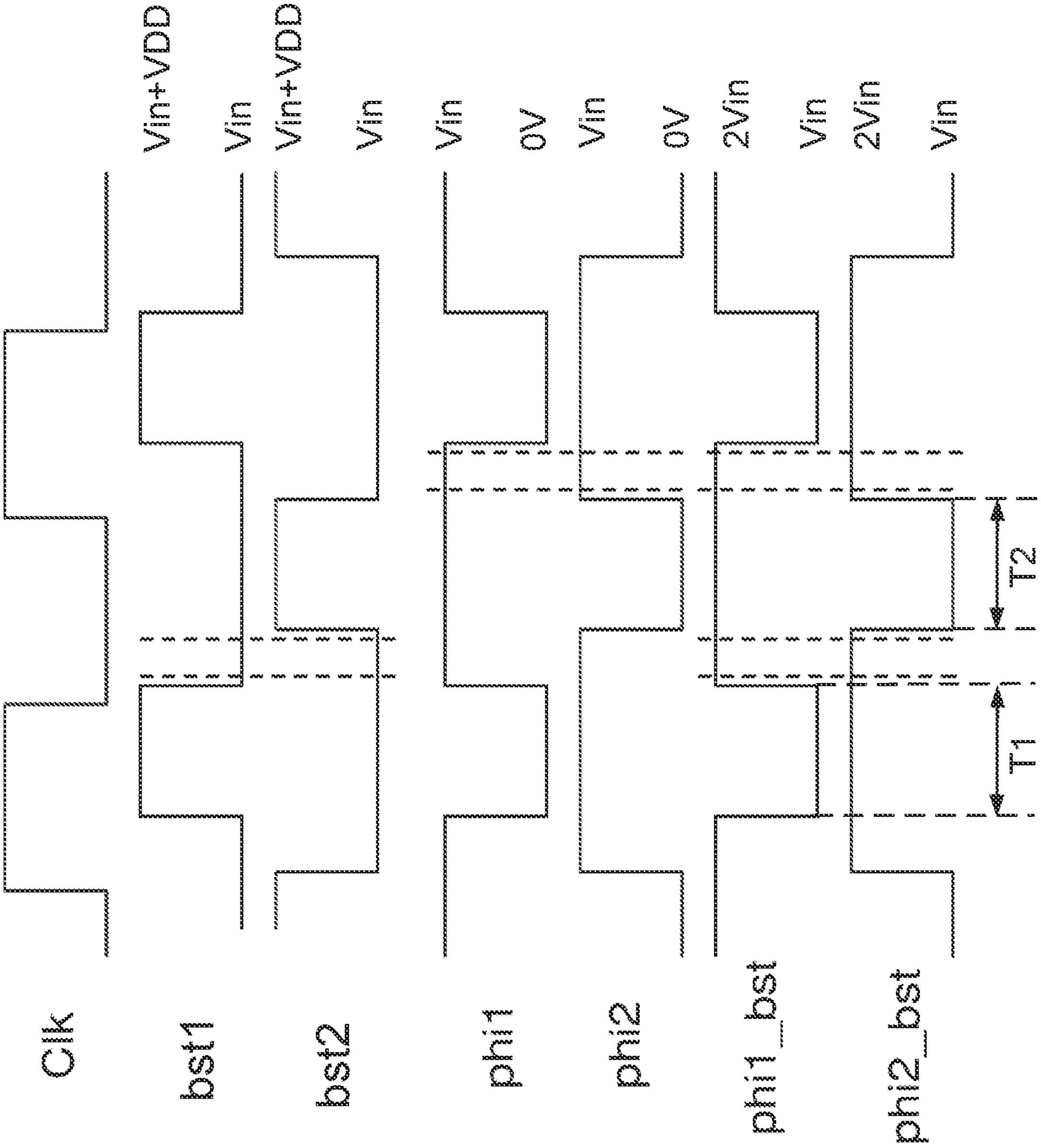
FIG. 7 is a timing diagram illustrating exemplary signals in the voltage booster of FIG. 6 according to certain aspects of the present disclosure.

Exemplary operations of the voltage booster 330 will now be described with reference to FIG. 7 according to certain aspects. FIG. 7 is a timing diagram showing an example of the control signals bst1, bst2, phi1, and phi2 generated by the control circuit 450. In this example, the control signals bst1, bst2, phi1, and phi2 are periodic signals having the same frequency (e.g., the frequency of the clock signal Clk). Each of the control signals phi1 and phi2 swings between the input voltage Vin of the voltage booster 330 and approximately zero volts. Each of the control signals bst2 and bst1 swings between Vin and Vin+VCC.

FIG. 7 also shows an example of the voltage phi1_*bst* at the first terminal 412 of the first capacitor 410, and the voltage phi2_*bst* at the first terminal 512 of the second capacitor 510. In the example in FIG. 7, each of the voltages phi1_*bst* and phi2_*bst* swings between approximately Vin and 2Vin. For ease of discussion, FIG. 7 shows the voltages phi1_*bst* and phi2_*bst* for the case wherein the LDO regulator 100 is in a steady-state condition.

During time period T1, charge is transferred between the second capacitor 510 and the output capacitor 460. More particularly, during the time period T1, the control circuit 450 sets the control signal phi2 to Vin to apply a boost voltage of approximately Vin to the second terminal 514 of the second capacitor 510. In the example in FIG. 7, this boosts the voltage phi2_*bst* at the first terminal 512 of the second capacitor 510 to approximately 2Vin. Also, during the time period T1, the control circuit 450 turns off (i.e., opens) the third switch 520 by setting control signal bst2 to approximately Vin, and the fourth switch 530 is turned on (i.e., closed) by the voltage phi1_*bst* at the first terminal 412 of the first capacitor 410. This allows charge to flow between the second capacitor 510 and the output capacitor 460 through the fourth switch 530 while the voltage of the second capacitor 510 is boosted.

Also, during the time period T1, the control circuit 450 turns on the first switch 420 by setting control signal bst1 to approximately Vin+VCC, allowing charge to flow from the output 126 of the amplifier 120 to the first capacitor 410 to charge the first terminal 412 of the first capacitor 410 to Vin. During this time, the second switch 430 is turned off by the voltage phi2_*bst* at the first terminal 512 of the second capacitor 510.

Thus, during time period T1, charge is transferred between the second capacitor 510 and the output capacitor 460, and the first terminal 412 of the first capacitor 410 is charged to Vin.

During time period T2, charge is transferred between the first capacitor 410 and the output capacitor 460. More particularly, during the time period T2, the control circuit 450 sets the control signal phi1 to Vin to apply a boost voltage of approximately Vin to the second terminal 414 of the first capacitor 410. In the example in FIG. 7, this boosts the voltage phi1_*bst* at the first terminal 412 of the first capacitor 410 to approximately 2Vin. Also, during the time period T2, the control circuit 450 turns off (i.e., opens) the first switch 420 by setting control signal bst1 to approximately Vin, and the second switch 430 is turned on (i.e., closed) by the voltage phi2_*bst* at the first terminal 512 of the second capacitor 510. This allows charge to flow between the first capacitor 410 and the output capacitor 460 through the second switch 430 while the voltage of the first voltage is boosted.

Also, during the time period T2, the control circuit 450 turns on the third switch 520 by setting control signal bst2 to approximately Vin+VCC, allowing charge to flow between the output 126 of the amplifier 120 to the second capacitor 510 to charge the first terminal 512 of the second capacitor 510 to Vin. During this time, the fourth switch 530 is turned off by the voltage phi1_*bst* at the first terminal 412 of the first capacitor 410.

Thus, during time period T2, charge is transferred between the first capacitor 410 and the output capacitor 460, and the first terminal 512 of the second capacitor 510 is charged to Vin.

In the example shown in FIG. 6, the voltage booster 330 also includes a PFET 470 for reducing the startup time of the voltage booster 330. The source of the PFET 470 is coupled to the input 332 of the voltage booster 330, and the gate and drain of the PFET 470 are coupled to the output 334 of the voltage booster 330. During startup when the input voltage Vin is greater than the output voltage Vout by at least the threshold voltage of the PFET 470, the PFET 470 turns on and provides a charging path from the input 332 to the output 334 to quickly charge the output capacitor 460. During the steady-state condition where the output voltage Vout is greater than the input voltage Vin (e.g., Vout is approximately 2Vin), the PFET 470 is turned off.

Figure 8:
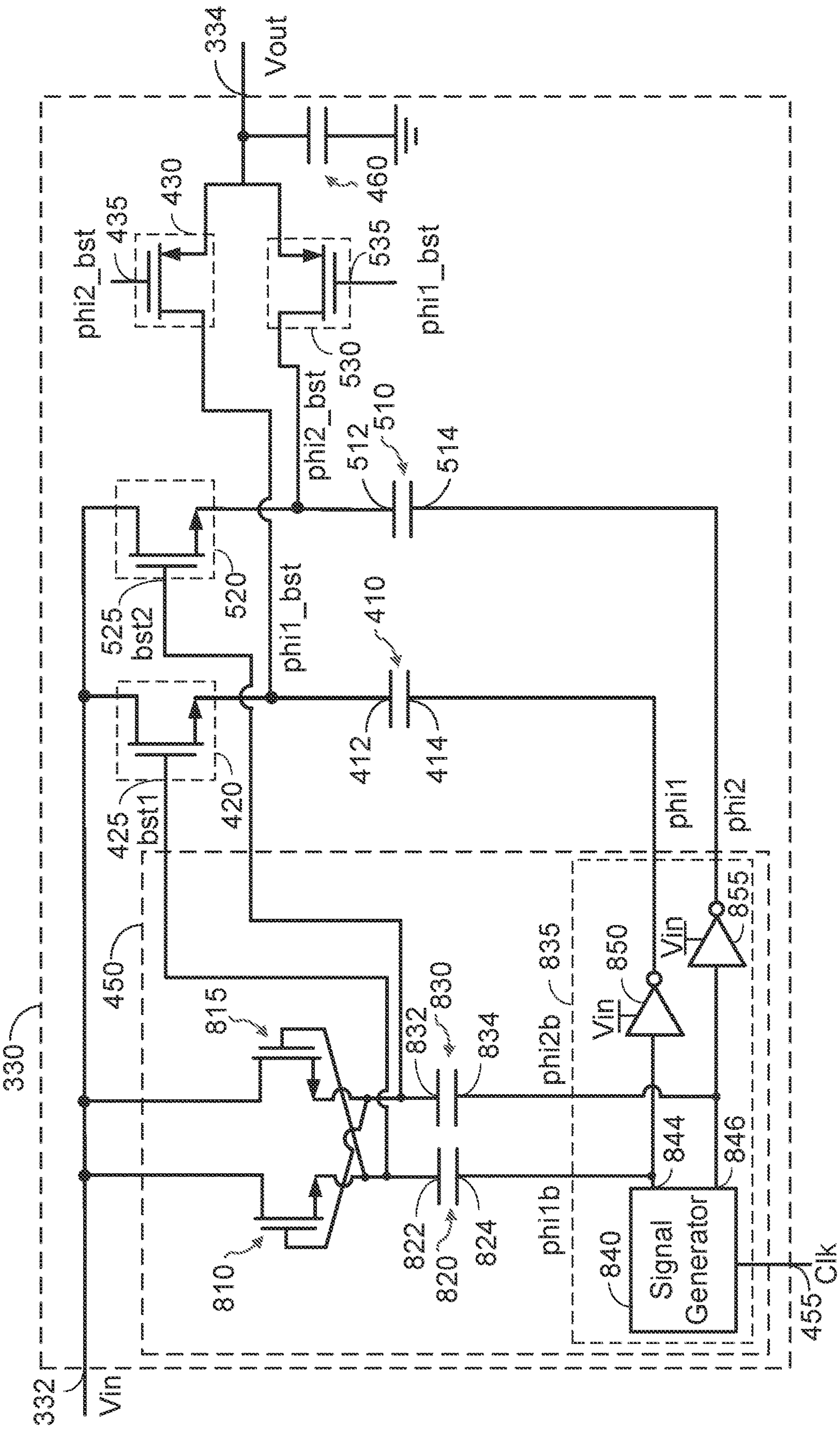
FIG. 8 shows an exemplary implementation of a control circuit in the voltage booster of FIG. 6 according to certain aspects of the present disclosure.

FIG. 8 shows an exemplary implementation of the control circuit 450 according to certain aspects of the present disclosure. Note that the PFET 470 is not shown in FIG. 8 for ease of illustration.

As discussed above, the control circuit 450 generates control signals bst1 and bst2 for controlling the first switch 420 and the third switch 520, respectively. In the example shown in FIG. 8, the control circuit 450 includes a first NFET 810, a second NFET 815, a third capacitor 820, a fourth capacitor 830, and a voltage boosting circuit 835. The drains of the first and second NFETs 810 and 815 are coupled to the input 332 of the voltage booster 330. The first and second NFETs 810 and 815 are cross-coupled in which the gate of the first NFET 810 is coupled to the source of the second NFET 815, and the gate of the second NFET 815 is coupled to the source of the first NFET 810. A first terminal 822 of the third capacitor 820 is coupled to the source of the first NFET 810, and a first terminal 832 of the fourth capacitor 830 is coupled to the source of the second NFET 815.

Figure 9:
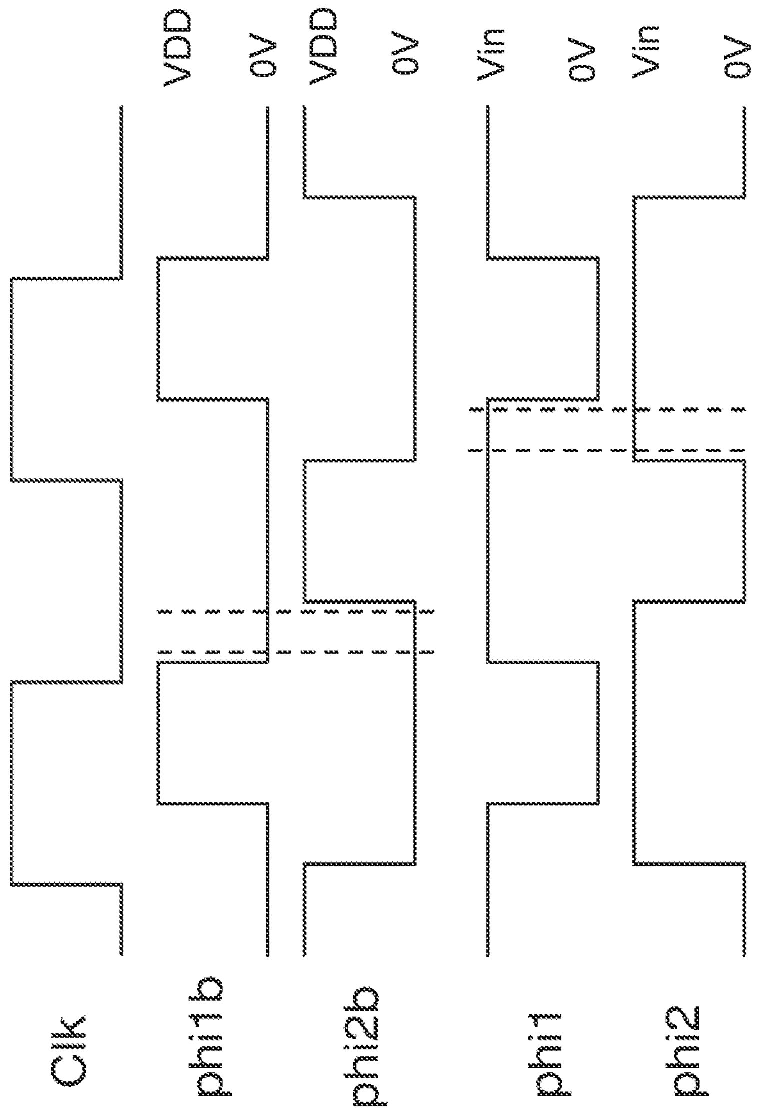
FIG. 9 is a timing diagram illustrating exemplary signals in the voltage booster of FIG. 8 according to certain aspects of the present disclosure.

In this example, the voltage boosting circuit 835 includes a signal generator 840. The signal generator 840 has an input 842 configured to receive the clock signal Clk, a first output 844 coupled to a second terminal 824 of the third capacitor 820, and a second output 846 coupled to a second terminal 834 of the fourth capacitor 830. The signal generator 840 is configured to generate control signals phi1*b* and phi2*b*, output the signal phi1*b* to the second terminal 824 of the third capacitor 820 via the first output 844, and output the signal phi2*b* to the second terminal 834 of the fourth capacitor 830 via the second output 846. FIG. 9 shows an exemplary timing diagram of signals phi1*b* and phi2*b*, in which each of the signals phi1*b* and phi2*b* swings between VCC and approximately zero volts.

The control signal bst1 is taken from the first terminal 822 of the third capacitor 820. Thus, in this example, the voltage of the control signal bst1 is equal to the voltage at the first terminal 822 of the third capacitor 820. The control signal bst2 is taken from the first terminal 832 of the fourth capacitor 830. Thus, in this example, the voltage of the control signal bst2 is equal to the voltage at the first terminal 832 of the fourth capacitor 830.

During operation, the voltages of the signals phi1*b* and phi2*b* alternately swing to VCC. When the voltage of signal phi1*b* is VCC and the voltage of signal phi2*b* is low (e.g., approximately zero volts), the first NFET 810 is turned off and the second NFET 815 is turned on. The voltage at the first terminal 822 of the third capacitor 820 (and hence the voltage of control signal bst1) is boosted to a voltage approximately equal to the sum of Vin and VCC (i.e., Vin+VCC). As a result, the first switch 420 is turned on. The boosted voltage at the first terminal 822 of the third capacitor 820 (which is also coupled to the gate of the second NFET 815) turns on the second NFET 815. As a result, the fourth capacitor 830 is charged to Vin through the second NFET 815.

When the voltage of signal phi1*b* is low (e.g., approximately zero volts) and the voltage of signal phi2*b* is VCC, the first NFET 810 is turned on and the second NFET 815 is turned off. The voltage at the first terminal 832 of the fourth capacitor 830 (and hence the voltage of control signal bst2) is boosted to a voltage approximately equal to Vin+VCC, which turns on the third switch 520. The boosted voltage at the first terminal 832 of the fourth capacitor 830 (which is also coupled to the gate of the first NFET 810) also turns on the first NFET 810. As a result, the third capacitor 820 is charged to Vin through the first NFET 810.

In the example in FIG. 8, the voltage boosting circuit 835 also includes a first inverter 850 coupled between the first output 844 of the signal generator 840 and the second terminal 414 of the first capacitor 410, and a second inverter 855 coupled between the second output 846 of the signal generator 840 and the second terminal 514 of the second capacitor 510. In this example, the first inverter 850 is configured to generate signal phi1 by inverting signal phi1*b* from the signal generator 840, and the second inverter 855 is configured to generate signal phi2 by inverting the signal phi2*b* from the signal generator 840. In certain aspects, each of the inverters 850 and 855 is powered by the input voltage Vin of the voltage booster 330 so that the voltage of each of the signals phi1 and phi2 swings between Vin and approximately zero volts. For ease of illustration, the connections between the inverters 850 and 855 and the input 332 of the voltage booster 330 are not shown in FIG. 8.

FIG. 9 is a timing diagram showing exemplary waveforms for the clock signal Clk and the controls signals phi1*b*, phil2*b*, phi1, and phi2 in the voltage booster of FIG. 8 according to certain aspects of the present disclosure. In the example shown in FIG. 9, the high phases (e.g., VCC) of the control signals phi1*b* and phi2*b* are non-overlapping.

During startup or a load transient, the output 126 of the amplifier 120 may saturate (i.e., reach VCC) due to the high input differential voltage (i.e., high difference between Vref and Vfb) and the high gain of the amplifier 120. In addition, voltages of transistors in the voltage booster 330 may get closer to limits of Vdg and Vds. As a result, the output 126 of the amplifier 120 may not be increased further to speed up the settling of the LDO regulator 100. This may cause the settling time of the LDO regulator 100 to be too long (e.g., exceed a settling time specification of the LDO regulator 100). For the case of a load transient, the settling time may also be referred to as recovery time.

To address the above, aspects of the present disclosure provide a detection circuit configured to detect the startup or a load transient, and to switch the voltage booster 330 to a higher clock frequency when startup or the load transient is detected. The higher clock frequency increases the charge pumping speed of the voltage booster 330, which reduces the settling time of the LDO regulator 100. When the LDO regulator 100 settles to a steady state of operation, the detection circuit may switch the voltage booster 330 to a lower clock frequency to reduce the power consumption of the voltage booster 330. The above features and other features of the present disclosure are discussed further below.

Figure 10:
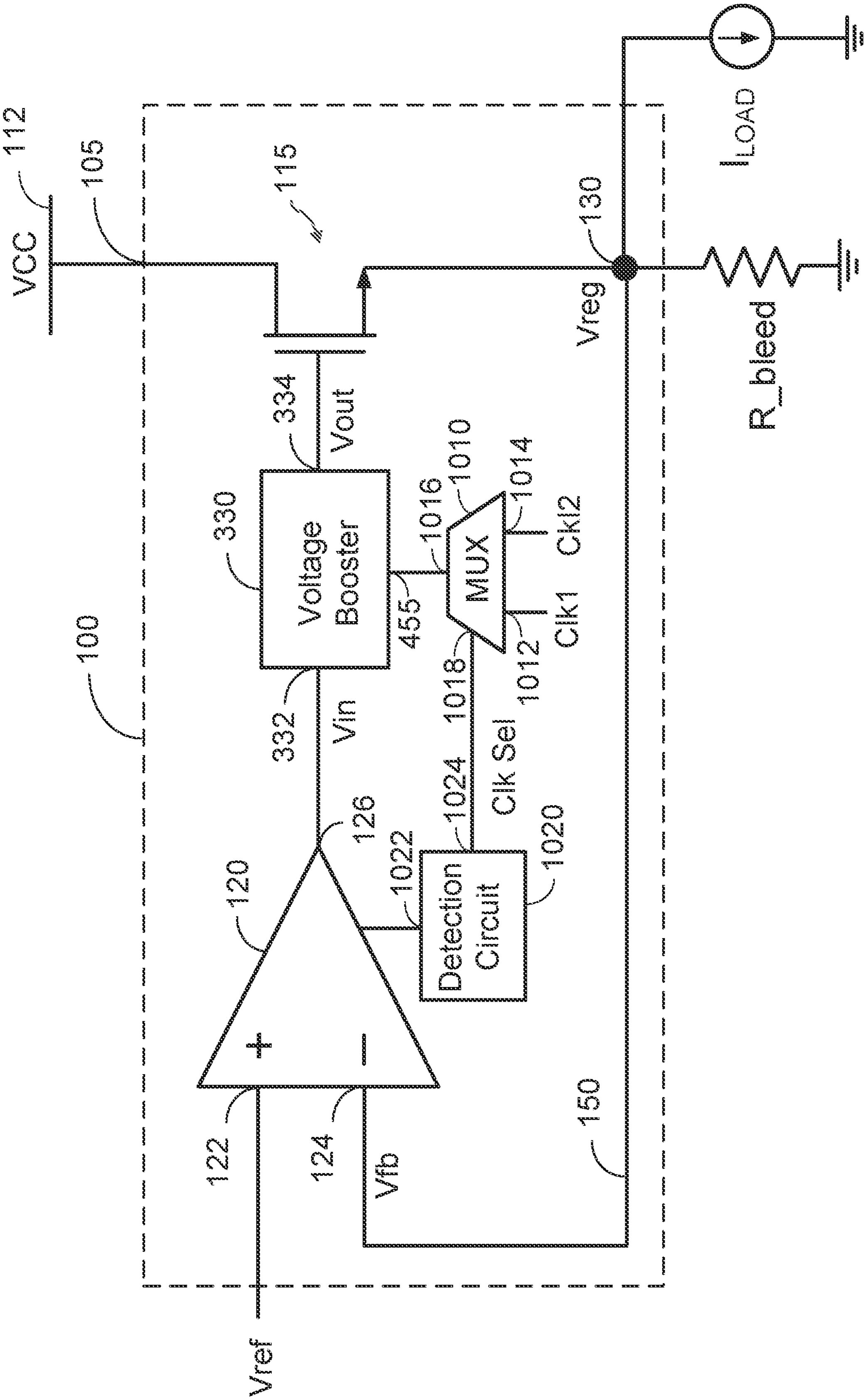
FIG. 10 shows an example of an LDO regulator including a detection circuit and a multiplexer to reduce settling time according to certain aspects of the present disclosure.

FIG. 10 shows an example in which the LDO regulator 100 includes a detection circuit 1020 and a multiplexer 1010 according to certain aspects.

In this example, the multiplexer 1010 has a first input 1012, a second input 1014, an output 1016, and a select input 1018. The first input 1012 is configured to receive a first clock signal Clk1, the second input 1014 is configured to receive a second clock signal Clk2, and the output 1016 is coupled to the clock input 455 of the voltage booster 330. The multiplexer 1010 is configured to receive a clock select signal (labeled "Clk Sel") from the detection circuit 1020, select the first clock signal Clk1 or the second clock signal Clk2 based on the clock select signal, and output the selected clock signal to the clock input 455 of the voltage booster 330.

In certain aspects, the first clock signal Clk1 has a clock frequency of fa and the second clock signal Clk2 has a higher clock frequency of $Nf_d$. Thus, in this example, the clock frequency of the second clock signal Clk2 is N times higher than the clock frequency of the first clock signal Clk1, where N is greater than one. The multiplexer 1010 allows the detection circuit 1020 to switch the voltage booster 330 to a higher clock frequency during startup or a load transient by causing the multiplexer 1010 to switch from the first clock signal Clk1 to the second clock signal Clk2 using the clock select signal. The clock signals Clk1 and Clk2 may be generated by a circuit (not shown) including one or more PLLs, one or more frequency dividers, or any combination thereof.

The detection circuit 1020 has an input 1022 coupled to the amplifier 120, and an output 1024 coupled to the select input 1018 of the multiplexer 1010. It is to be appreciated that the input 1022 may include one or more inputs. In certain aspects, the detection circuit 1020 is configured to detect startup or a load transient based on signals in the amplifier 120, and cause the multiplexer 1010 to select the second clock signal Clk2 when the startup or the load transient is detected in order to switch the voltage booster 330 to the higher clock frequency $Nf_d$. The higher clock frequency $Nf_d$ increases the charge pumping speed of the voltage booster 330, which reduces the settling time of the LDO regulator 100. When the LDO regulator 100 settles to a steady state of operation, the detection circuit 1020 causes the multiplexer 1010 to select the first clock signal Clk1 to switch the voltage booster 330 to the lower clock frequency $f_d$ to reduce the power consumption of the voltage booster 330 in steady state.

In certain aspects, the detection circuit 1020 is configured to detect the input differential voltage (i.e., difference between Vref and Vfb) of the amplifier 120 based on signals in the amplifier 120 indicative of the input differential voltage. In these aspects, the detection circuit 1020 may be configured to cause the multiplexer 1010 to select the second clock signal Clk2 when the input differential voltage is above a threshold voltage and cause the multiplexer 1010 to select the first clock signal Clk1 when the input differential voltage is below the threshold voltage.

For example, during startup, the feedback voltage Vfb may start at zero volts, resulting in a high input differential voltage (i.e., high difference between Vref and Vfb) that is above the threshold voltage. In this example, the detection circuit 1020 causes the multiplexer 1010 to select the second clock signal Clk2 to increase the clock frequency of the voltage booster 330. The increased clock frequency reduces the settling time of the LDO regulator 100, as discussed above.

As the LDO regulator 100 settles, the feedback voltage Vfb increases, which decreases the input differential voltage (i.e., difference between Vref and Vfb). Eventually, the input differential voltage drops below the threshold, and the detection circuit 1020 causes the multiplexer 1010 to select the first clock signal Clk1 to reduce the clock frequency for steady state operation.

During a load transient, the load current may abruptly change by a large amount, resulting in a high input differential voltage (i.e., high difference between Vref and Vfb) that is above the threshold voltage. In this example, the detection circuit 1020 causes the multiplexer 1010 to switch from the first clock signal Clk1 to the second clock signal Clk2 to increase the clock frequency of the voltage booster 330. The increased clock frequency reduces the recovery time of the LDO regulator 100, as discussed above.

As the LDO regulator 100 recovers, the input differential voltage (i.e., difference between Vref and Vfb) decreases. Eventually, the input differential voltage drops below the threshold, and the detection circuit 1020 causes the multiplexer 1010 to switch back to the first clock signal Clk1.

It is to be appreciated that the threshold voltage may vary across temperature and/or process corners. In this example, the detection circuit 1020 may be configured such that the threshold voltage stays above the input differential voltage during steady state operation across a range of temperatures and/or across process corners. In other words, it is to be appreciated the threshold voltage need not be fixed as long as the threshold voltage stays above the input differential voltage during steady state operation so that the detection circuit 1020 keeps the voltage booster 330 at the lower clock frequency fa during steady state operation.

Figure 11:
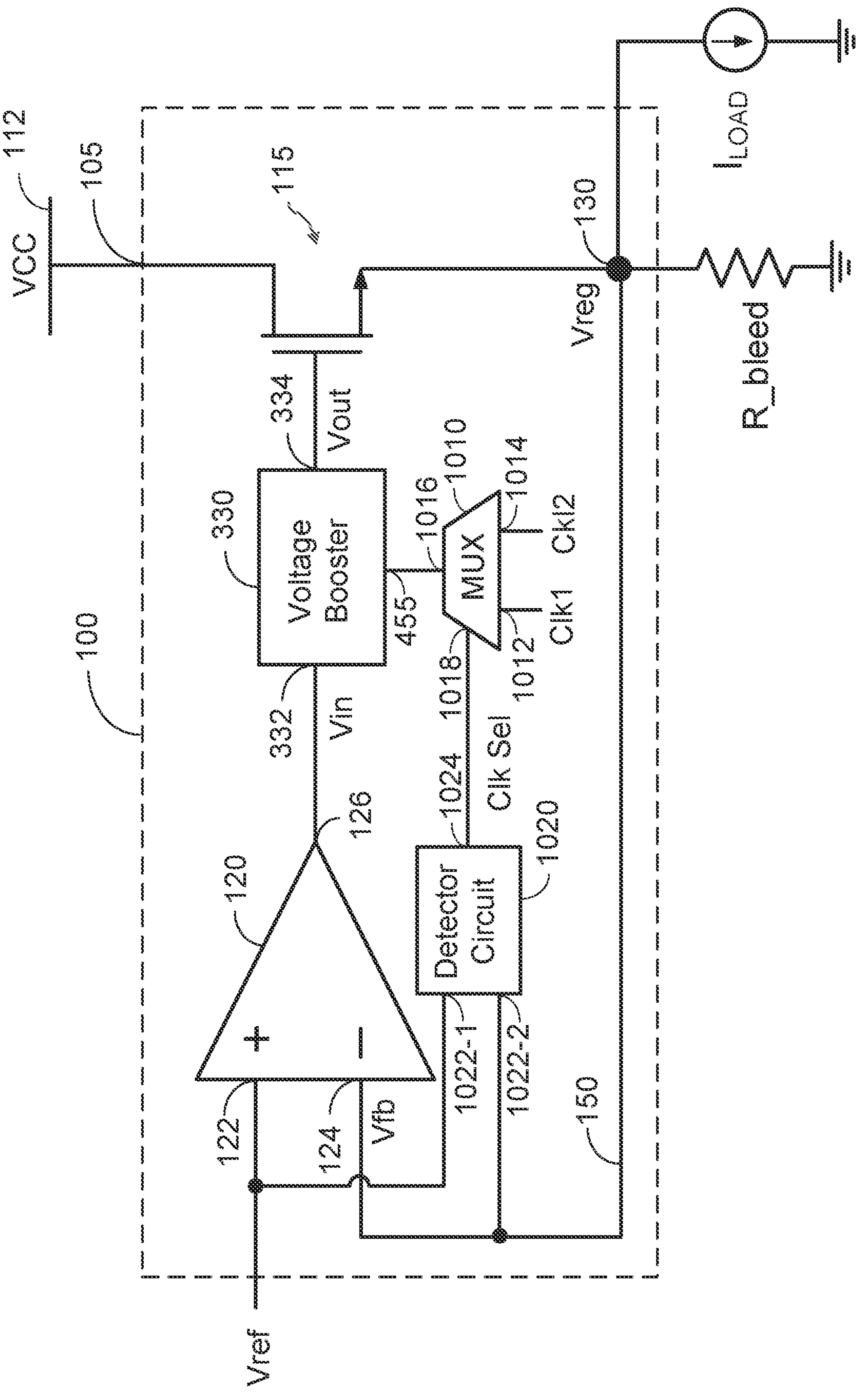
FIG. 11 shows another example of an LDO regulator including a detection circuit and a multiplexer to reduce settling time according to certain aspects of the present disclosure.

FIG. 11 shows an example in which the detection circuit 1020 is coupled directly to the inputs 122 and 124 of the amplifier 120 to detect the input differential voltage. In this example, the input 1022 of the detection circuit 1020 includes a first input 1022-1 coupled to the first input 122 of the amplifier 120, and a second input 1022-2 coupled to the second input 124 of the amplifier 120. In this example, the detection circuit 1020 may detect the input differential voltage by sensing the voltage difference between the first input 1022-1 and the second input 1022-2.

Figure 12:
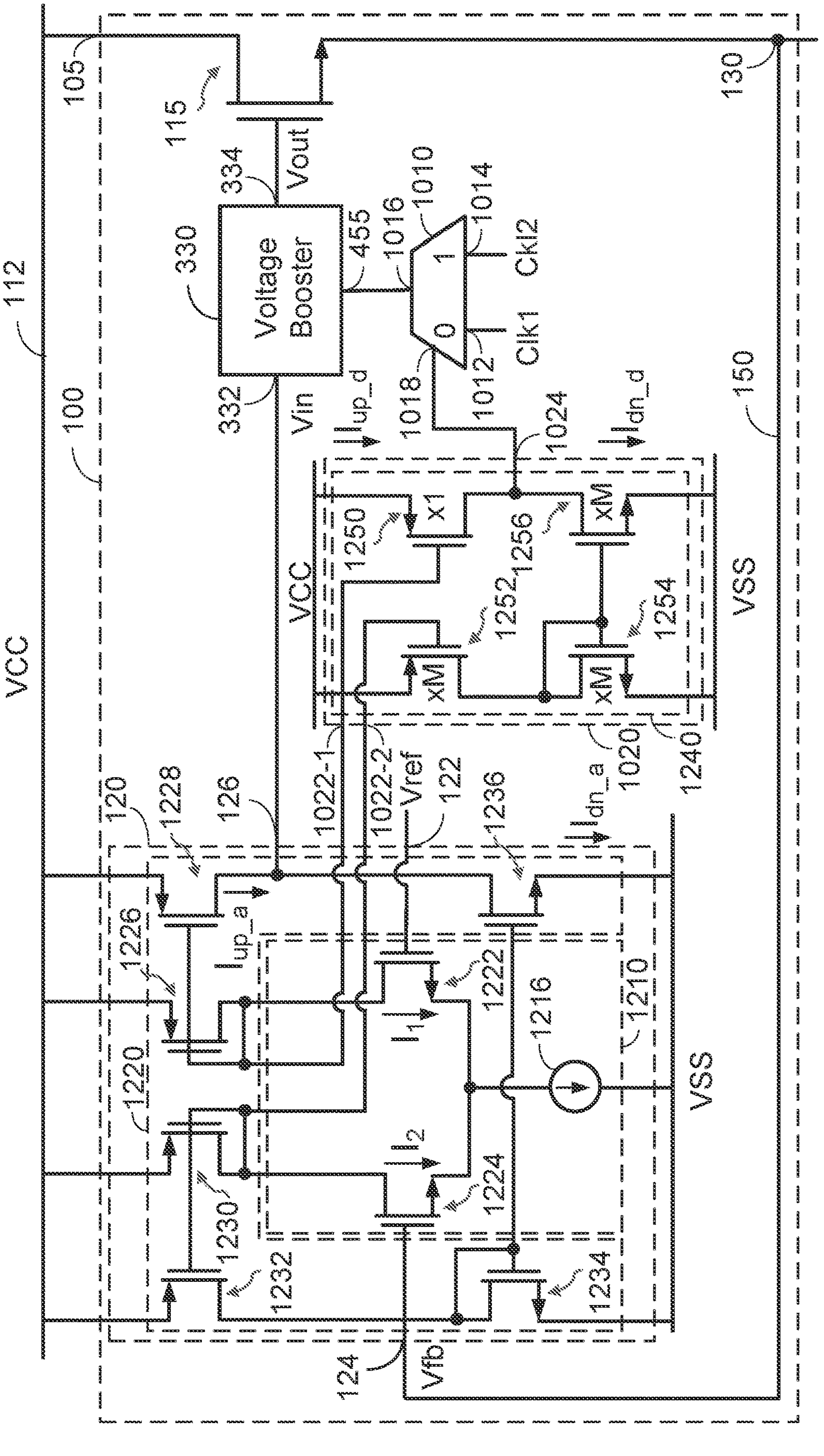
FIG. 12 shows an exemplary implementation of a detection circuit according to certain aspects of the present disclosure.

FIG. 12 shows an example implementation of the amplifier 120 and the detection circuit 1020 according to certain aspects of the present disclosure. In this example, the amplifier 120 includes an input stage 1210 (also referred to as a first stage) and a current mirror 1220. The input stage 1210 includes a first input transistor 1222, a second input transistor 1224, and a bias current source 1216. The first input transistor 1222 has a gate coupled to the first input 122 of the amplifier 120 to receive the reference voltage Vref, and a source coupled to the bias current source 1216. The second input transistor 1224 has a gate coupled to the second input 124 of the amplifier 120, and a source coupled to the bias current source 1216. In the example shown in FIG. 12, each of the input transistors 1222 and 1224 is implemented with a respective NFET. However, it is to be appreciated that the present disclosure is not limited to this example.

The bias current source 1216 is coupled between the sources of the input transistors 1222 and 1224 and ground (or some reference potential). The bias current source 1216 is configured to provide the input transistors 1222 and 1224 with a bias current. The current mirror 1220 is coupled to the drain of the first input transistor 1222, the drain of the second input transistor 1224, and the output 126 of the amplifier 120.

In operation, the first input transistor 1222 is configured to convert the reference voltage Vref into a first current $I_1$ at the drain of the first input transistor 1222, and the second input transistor 1224 is configured to convert the feedback voltage Vfb into a second current $I_2$ at the drain of the second input transistor 1224. In this regard, the input stage 1210 may also be referred to as a transconductance stage.

The current mirror 1220 is configured to generate a pull-up current $I_{up\_a}$ at the output 126 of the amplifier 120 based on the first current $I_1$ by mirroring the first current $I_1$ to the output 126. The pull-up current $I_{up\_a}$ is proportional to the first current $I_1$. The current mirror 1220 is also configured to generate a pull-down current $I_{dn\_a}$ at the output 126 of the amplifier 120 based on the second current $I_2$ by mirroring the second current $I_2$ to the output 126. The pull-down current $I_{dn\_a}$ is proportional to the second current $I_2$. As used herein, the term "proportional" convers the possibility of a proportionality factor (i.e., scaling factor) of one or greater than one.

When the pull-up current $I_{up\_a}$ is greater than the pull-down current $I_{dn\_a}$, current flows from the output 126 of the amplifier 120 to the capacitive load coupled to the output 126 of the amplifier 120, which increases the input voltage Vin. The current flowing from the output 126 may be equal to the difference between the pull-up current $I_{up\_a}$ and the pull-down current $I_{dn\_a}$. In this example, the pull-up current $I_{up\_a}$ may be greater than the pull-down current $I_{dn\_a}$ when Vref is greater than Vfb. The capacitive load may include a capacitor (not shown) coupled to the output 126, parasitic capacitances, capacitances in the voltage booster 330, or any combination thereof.

When the pull-down current $I_{dn\_a}$ is greater than the pull-up current $I_{up\_a}$, the output 126 of the amplifier 120 draws current from the capacitive load coupled to the output 126 of the amplifier 120, which decreases the input voltage Vin. The current drawn by the output 126 may be equal to the difference between the pull-down current $I_{dn\_a}$ and the pull-up current $I_{up\_a}$. In this example, the pull-down current $I_{dn\_a}$ may be greater than the pull-up current $I_{up\_a}$ when Vfb is greater than Vref.

In the example in FIG. 12, the current mirror 1220 includes a first transistor 1226, a second transistor 1228, a third transistor 1230, a fourth transistor 1232, a fifth transistor 1234, and a sixth transistor 1236. The source of the first transistor 1226 is coupled to the supply rail 112, the drain of the first transistor 1226 is coupled to the drain of the first input transistor 1222, and the gate and the drain of the first transistor 1226 are coupled together. The source of the second transistor 1228 is coupled to the supply rail 112, the gate of the second transistor 1228 is coupled to the gate of the first transistor 1226, and the drain of the second transistor 1228 is coupled to the output 126 of the amplifier 120. In this example, the first transistor 1226 and the second transistor 1228 mirror the first current $I_1$ to the drain of the second transistor 1228 to provide the pull-up current $I_{up\_a}$. The pull-up current $I_{up\_a}$ is proportional to the first current $I_1$ depending on the ratio of the channel width of the first transistor 1226 to the channel width of the second transistor 1228.

The source of the third transistor 1230 is coupled to the supply rail 112, the drain of the third transistor 1230 is coupled to the drain of the second input transistor 1224, and the gate and the drain of the third transistor 1230 are coupled together. The source of the fourth transistor 1232 is coupled to the supply rail 112, and the gate of the fourth transistor 1232 is coupled to the gate of the third transistor 1230. The drain of the fifth transistor 1234 is coupled to drain of the fourth transistor 1232, the gate and the drain of the fifth transistor 1234 are coupled together, and the source of the fifth transistor 1234 is coupled to ground. The gate of the sixth transistor 1236 is coupled to the gate of the fifth transistor 1234, the source of the sixth transistor 1236 is coupled to ground, and the drain to the sixth transistor 1236 is coupled to the output 126 of the amplifier 120. In this example, the transistors 1230, 1232, 1234, and 1236 mirror the second current $I_2$ to the drain of the sixth transistor 1236 to provide the pull-down current $I_{dn\_a}$. The pull-down current $I_{dn\_a}$ is proportional to the second current $I_2$ depending on relative channel widths of the transistors 1230, 1232, 1234, and 1236.

In the example shown in FIG. 12, each of the transistors 1226, 1228, 1230, and 1232 is implemented with a respective PFET, and each of the transistors 1234 and 1236 is implemented with a respective NFET. However, it is to be appreciated that the present disclosure is not limited to this example.

In the example in FIG. 12, the detection circuit 1020 includes a current mirror 1240 coupled to the drains of the input transistors 1222 and 1224, which are coupled to the gates of the transistors 1226 and 1230, respectively. In this example, the current mirror 1240 is configured to mirror the first current $I_1$ to provide a pull-up current $I_{up\_d}$ at the output 1024 of the detection circuit 1020. The current mirror 1240 is also configured to mirror the second current $I_2$ to provide a pull-down current $I_{dn\_d}$ at the output 1024 of the detection circuit 1020.

In this example, the pull-up current $I_{up\_d}$ is proportional to the first current $I_1$ by a first scaling factor, and the pull-down current $I_{dn\_d}$ is proportional to the second current $I_2$ by a second scaling factor. The second scaling factor is M times (e.g., ten times) the first scaling factor where M is greater than one. The reason for the larger scaling factor for the pull-down current $I_{dn\_d}$ is discussed below. The first scaling factor may be one or greater than one.

In this example, the current mirror 1240 is configured to pull the output 1024 to the supply voltage VCC (i.e., logic one) when the pull-up current $I_{up\_d}$ is greater than the pull-down current $I_{dn\_d}$, and pull the output 1024 to ground (i.e., logic zero) when the pull-down current $I_{dn\_d}$ is greater than the pull-up current $I_{up\_d}$. In the example shown in FIG. 12, the multiplexer 1010 is configured to select the first clock signal Clk1 when the output 1024 of the detection circuit 1020 is logic zero, and select the second clock signal Clk2 when the output 1024 of the detection circuit 1020 is logic one.

Exemplary operations of the detection circuit 1020 will now be described according to certain aspects.

When the input differential voltage (i.e., difference between Vref and Vfb) is high, the second input transistor 1224 may be turned off or mostly turned off while the first input transistor 1222 may be strongly turned on. For example, during startup, the feedback voltage Vfb may initially be approximately zero volts, turning off the second input transistor 1224. As a result, the second current $I_2$ (and hence the pull-down current $I_{dn\_d}$) may be zero or close to zero amps. This allows the pull-up current $I_{up\_d}$ to pull the output 1024 of the detection circuit 1020 to logic one, which causes the multiplexer 1010 to select the second clock signal Clk2 (i.e., the higher clock frequency). The higher clock frequency speeds up the charge pumping of the voltage booster 330, which reduces the settling time.

As the LDO regulator 100 settles to the steady state, the input differential voltage (i.e., difference between Vref and Vfb) becomes smaller. When the feedback voltage Vfb gets close to the reference Vref, the pull-down current $I_{up\_d}$ becomes greater than the pull-up current $I_{dn\_a}$ due to the larger scaling factor for the pull-down current $I_{dn\_d}$. As a result, the pull-down current $I_{up\_d}$ pulls the output 1024 of the detection circuit 1020 to logic zero (e.g., ground potential), which causes the multiplexer 1010 to select the first clock signal Clk (i.e., lower frequency clock) for steady state operation. In this example, the larger scaling factor for the pull-down current $I_{dn\_d}$ helps ensure that the pull-down current $I_{dn\_d}$ is greater than the pull-up current $I_{up\_d}$ during steady state operation even when the first current $I_1$ is slightly greater than the second current $I_2$ during steady state operation.

In this example, the threshold of the detection circuit 1020 discussed above depends on the scaling factor difference (i.e., M) between the pull-down current $I_{up\_d}$ and the pull-up current $I_{up\_d}$. For example, the threshold may be increased by increasing the scaling factor difference (i.e., M). This is because, when the scaling factor difference is increased, the first current $I_1$ needs to be higher than the second current $I_2$ by a greater amount in order for the pull-up current $I_{dn\_d}$ to be higher than the pull-down current $I_{dn\_d}$ to pull the output 1024 of the detection circuit 1020 to logic one.

In the example in FIG. 12, the current mirror 1240 includes a first transistor 1250, a second transistor 1252, a third transistor 1254, and a fourth transistor 1256. The source of the first transistor 1250 is coupled to the supply rail 112, the gate of the first transistor 1250 is coupled to the first input 1022-1, and the drain of the first transistor 1250 is coupled to the output 1024 of the detection circuit 1020. In this example, the first input 1022-1 of the detection circuit 1020 is coupled to the drain of the first input transistor 1222 and the gate of the first transistor 1226 in the amplifier 120. In this example, the first current $I_1$ is mirrored at the drain of the first transistor 1250 to provide the pull-up current $I_{dn\_d}$.

The source of the second transistor 1252 is coupled to the supply rail 112, and the gate of the second transistor 1252 is coupled to the second input 1022-2. The second input 1022-2 is coupled to the drain of the second input transistor 1224 and the gate of the third transistor 1230 in the amplifier 120. The drain of the third transistor 1254 is coupled to the drain of the second transistor 1252, the drain and the gate of the third transistor 1254 are coupled together, and the source of the third transistor 1254 is coupled to ground. The gate of the fourth transistor 1256 is coupled to the gate of the third transistor 1254, the drain of the fourth transistor 1256 is coupled to the output 1024 of the detection circuit 1020, and the source of the fourth transistor 1256 is coupled to ground. In this example, the second current $I_2$ is mirrored at the drain of the fourth transistor 1256 to provide the pull-down current $I_{dn\_d}$. In the example shown in FIG. 12, the channel widths of each of the second transistor 1252, the third transistor 1254, and the fourth transistor 1256 is M times the channel width of the first transistor 1250 such that the second scaling factor is M times the first scaling factor.

Figure 13:
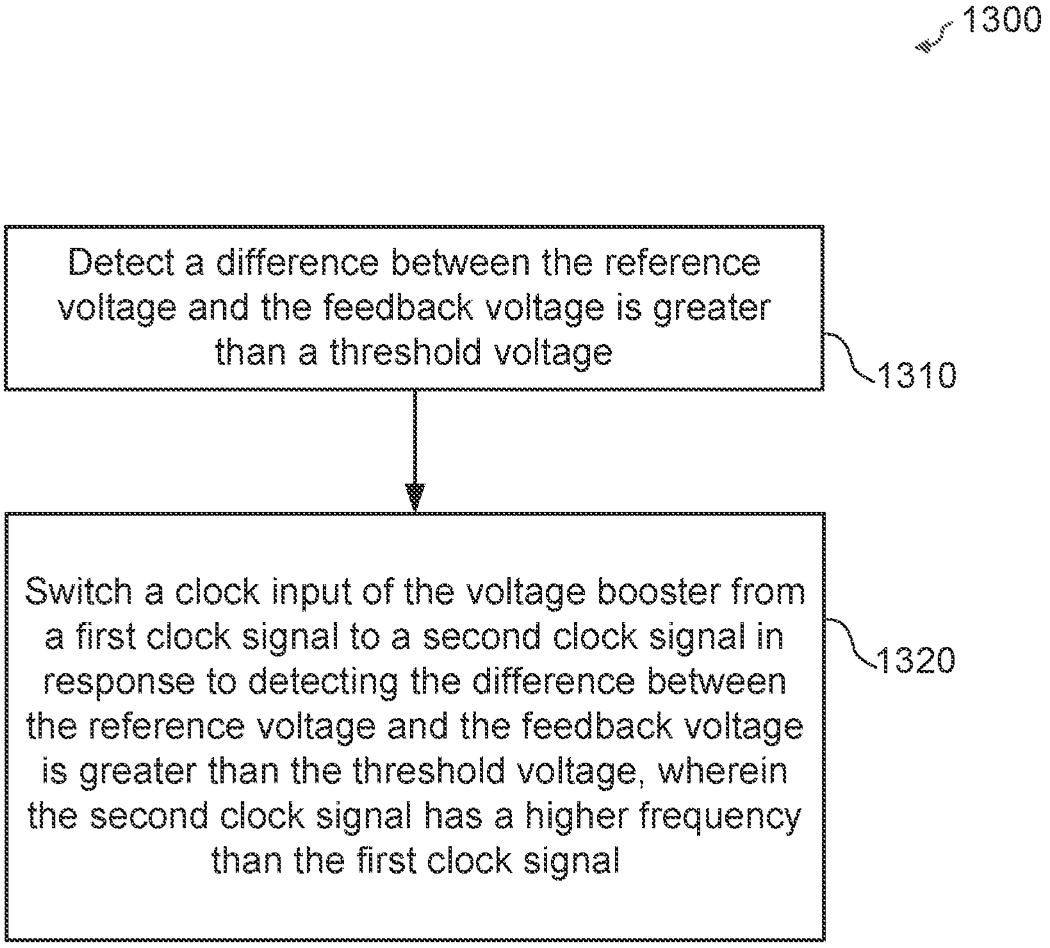
FIG. 13 is a flowchart illustrating an example of a method of operating a voltage regulator according to certain aspects of the present disclosure.

FIG. 13 illustrates a method 1300 of operating a voltage regulator (e.g., the LDO regulator 100) according to certain aspects. The voltage regulator includes a pass transistor (e.g., the pass NFET 115), an amplifier (e.g., the amplifier 120), and a voltage booster (e.g., the voltage booster 330) coupled between an output of the amplifier and a gate of the pass transistor, wherein a first input (e.g., first input 122) of the amplifier receives a reference voltage and a second input (e.g., second input 124) of the amplifier receives a feedback voltage via a feedback path (e.g., feedback path 150) coupled to a source of the pass transistor.

At block 1310, a difference between the reference voltage and the feedback voltage greater than a threshold voltage is detected. For example, the difference between the reference voltage and the feedback voltage may be detected by the detection circuit 1020. In this example, the voltage difference between the reference voltage and the feedback voltage being greater than the threshold voltage may indicate startup of the voltage regulator or a load transient.

At block 1320, a clock input of the voltage booster is switched from a first clock signal to a second clock signal in response to detecting the difference between the reference voltage and the feedback voltage is greater than the threshold voltage, wherein the second clock signal has a higher clock frequency than the first clock signal. For example, the clock input (e.g., clock input 455) of the voltage booster may be switched from the first clock signal (e.g., first clock signal Clk1) to the second clock signal (e.g., second clock signal Clk2) by the multiplexer 1010.

In certain aspects, the method 1300 may further include detecting the difference between the reference voltage and the feedback voltage is less than the threshold voltage, and switching the clock input of the voltage booster from the second clock signal to the first clock signal in response to detecting the difference between the reference voltage and the feedback voltage is less than the threshold voltage. In this example, the voltage difference between the reference voltage and the feedback voltage being less than the threshold voltage may indicate that the voltage regulator has settled to a steady state.

In the above examples, the detection circuit 1020 reduces settling time during startup or a load transient by switching the LDO regulator 100 to the higher clock frequency (e.g., the second clock signal) when the startup or the load transient is detected. In other implementations, the detection circuit 1020 reduces settling time during startup or a load transient by switching the boost capacitor (e.g., capacitor 410) to a higher capacitance when the startup or the load transient is detected. The higher capacitance reduces the settling time by increasing the total amount of charge transfer in a unit time (e.g., in a cycle of the clock signal Clk). When the LDO regulator 100 settles to a steady state of operation, the detection circuit 1020 may switch the boost capacitor to a lower capacitance. The above features and other features of the present disclosure are discussed further below.

Figure 14:
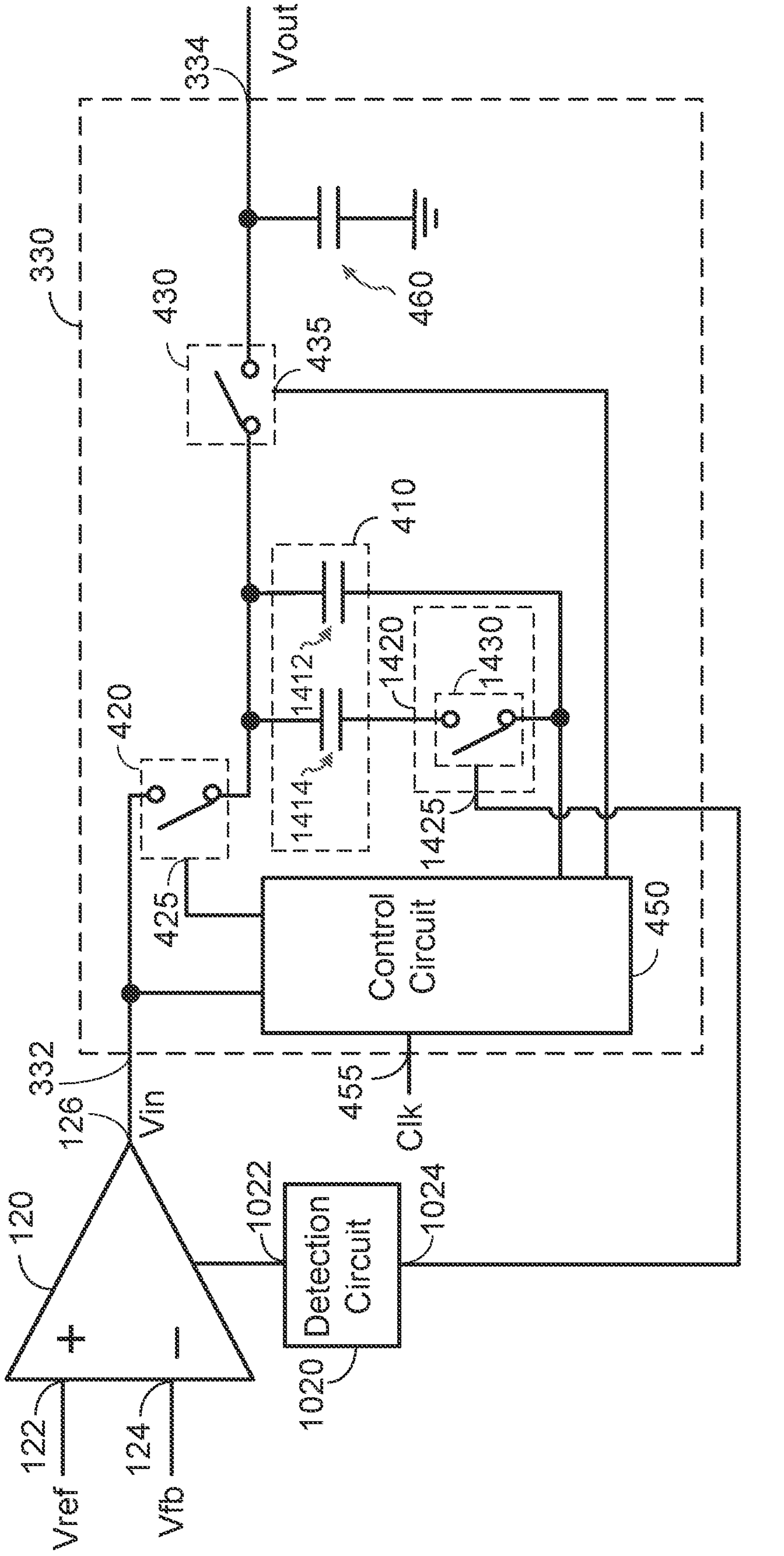
FIG. 14 shows an example of an LDO regulator including a boost capacitor and a detection circuit configured to switch the boost capacitor between a first capacitance and a second capacitance according certain aspects of the present disclosure.

FIG. 14 shows an exemplary implementation of the voltage booster 330 according to certain aspects. In this example, the voltage booster 330 includes the control circuit 450, the first switch 420, the second switch 430, the capacitor 410, and the output capacitor 460 discussed above. The voltage booster 330 also includes a capacitance controller 1420 configured to switch the capacitor 410 between a first capacitance and a second capacitance higher than the first capacitance. As discussed further below, the detection circuit 1020 causes the capacitance controller 1420 to switch the capacitor 410 from the first capacitance to the second capacitance when the detection circuit 1020 detects startup or a load transient. The capacitor 410 may also be referred to as a boost capacitor since the capacitor 410 is used for voltage boosting.

As discussed above, during the charge phase, the control circuit 450 charges the capacitor 410 with current from the amplifier 120 by closing the first switch 420. The capacitor 410 may be charged to the voltage Vin at the input 332 of the voltage booster 330 (which is coupled to the output 126 of the amplifier 120). During the transfer phase, the control circuit 450 boosts the voltage of the capacitor 410 (e.g., to a voltage of 2Vin for a voltage doubler implementation) and transfers charge from the capacitor 410 to the output capacitor 460 by closing the second switch 430.

In the example in FIG. 14, the input 1022 of the detection circuit 1020 is coupled to the amplifier 120 and the output 1024 of the detection circuit 1020 is coupled to the capacitance controller 1420. The detection circuit 1020 may be implemented with any of the exemplary implementations discussed above with references to FIGS. 10, 11 and 12. In operation, the detection circuit 1020 is configured to detect startup or a load transient, and cause the capacitance controller 1420 to switch the capacitor 410 to the second capacitance (i.e., higher capacitance) when the startup or the load transient is detected.

As discussed above, the detection circuit 1020 may detect the startup or the load transient by detecting the input differential voltage (i.e., difference between Vref and Vfb) of the amplifier 120 based on signals in the amplifier 120 indicative of the input differential voltage. The detection circuit 1020 may detect the startup or the load transient when the input differential voltage is greater than a threshold voltage. In this example, the detection circuit 1020 may cause the capacitance controller 1420 to switch the capacitor 410 from the first capacitance to the second capacitance when the input differential voltage is greater than the threshold voltage. The detection circuit 1020 may cause the capacitance controller 1420 to switch the capacitor 410 from the second capacitance to the first capacitor when the input differential voltage is less than the threshold voltage.

Figure 15:
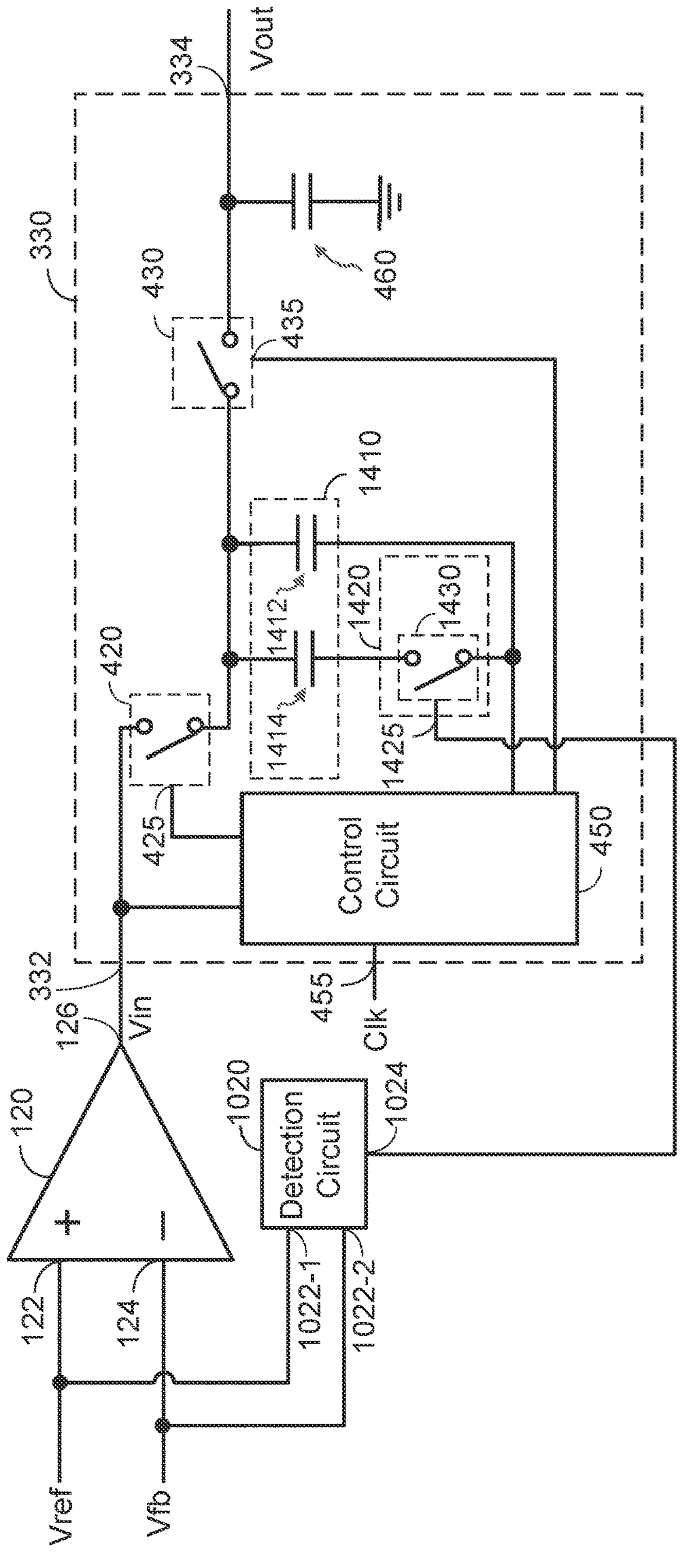
FIG. 15 shows another example of an LDO regulator including a boost capacitor and a detection circuit configured to switch the boost capacitor between a first capacitance and a second capacitance according certain aspects of the present disclosure.

FIG. 15 shows an example in which the detection circuit 1020 is coupled directly to the inputs 122 and 124 of the amplifier 120 to detect the input differential voltage. In this example, the input 1022 of the detection circuit 1020 includes the first input 1022-1 coupled to the first input 122 of the amplifier 120, and the second input 1022-2 coupled to the second input 124 of the amplifier 120. In this example, the detection circuit 1020 may detect the input differential voltage by sensing the voltage difference between the first input 1022-1 and the second input 1022-2.

In the examples shown in FIGS. 14 and 15, the capacitance controller 1420 has an input 1425 coupled to the output 1024 of the detection circuit 1020. The capacitance controller 1420 may be configured to switch the capacitor 410 to the first capacitance when the capacitance controller 1420 receives a first logic value (e.g., zero) at the input 1425 and switch the capacitor 410 to the second capacitance when the capacitance controller 1420 receives a second logic value (e.g., one) at the input 1425. In this example, the detection circuit 1020 causes the capacitance controller 1420 to switch the capacitor 410 to the second capacitance by outputting the second logic value (e.g., one) to the input 1425 of the capacitance controller 1420, and causes the capacitance controller 1420 to switch the capacitor 410 to the first capacitance by outputting the first logic value (e.g., zero) to the input 1425 of the capacitance controller 1420.

In the examples shown in FIGS. 14 and 15, the capacitor 410 includes a first capacitor 1412 and a second capacitor 1414, and the capacitance controller 1420 includes a switch 1430. The top terminal of the first capacitor 1412 is coupled to the switches 420 and 430 and the bottom terminal of the first capacitor 1412 is coupled to the control circuit 450. The second capacitor 1414 and the switch 1430 are coupled in series between the switches 420 and 430 and the control circuit 450. In this example, the first capacitor 1412 has a capacitance of C and the second capacitor 1414 has a capacitance of nC where n may be an integer, a fraction, or a mixed number.

In this example, the switch 1430 is opened to switch the capacitor 410 to the first capacitance. In this case, the bottom terminal of the second capacitor 1414 is floating and the first capacitance is approximately equal to the capacitance C of the first capacitor 1412. The switch 1430 is closed to switch the capacitor 410 to the second capacitance. In this case, the second capacitance is approximately equal to the sum of the capacitances of the first capacitor 1412 and the second capacitor 1414 (i.e., C+nC). In this example, the switch 1430 may be configured to open when the capacitance controller 1420 receives the first logic value (e.g., zero) at the input 1425 and close when the capacitance controller 1420 receives the second logic value (e.g., one) at the input 1425. The switch 1430 may be implemented with a transistor, a transmission gate, or another type of switch. For the example where the switch 1430 is implemented with a transistor, the gate of the transistor is coupled to the input 1425 of the capacitance controller 1420.

Figure 16:
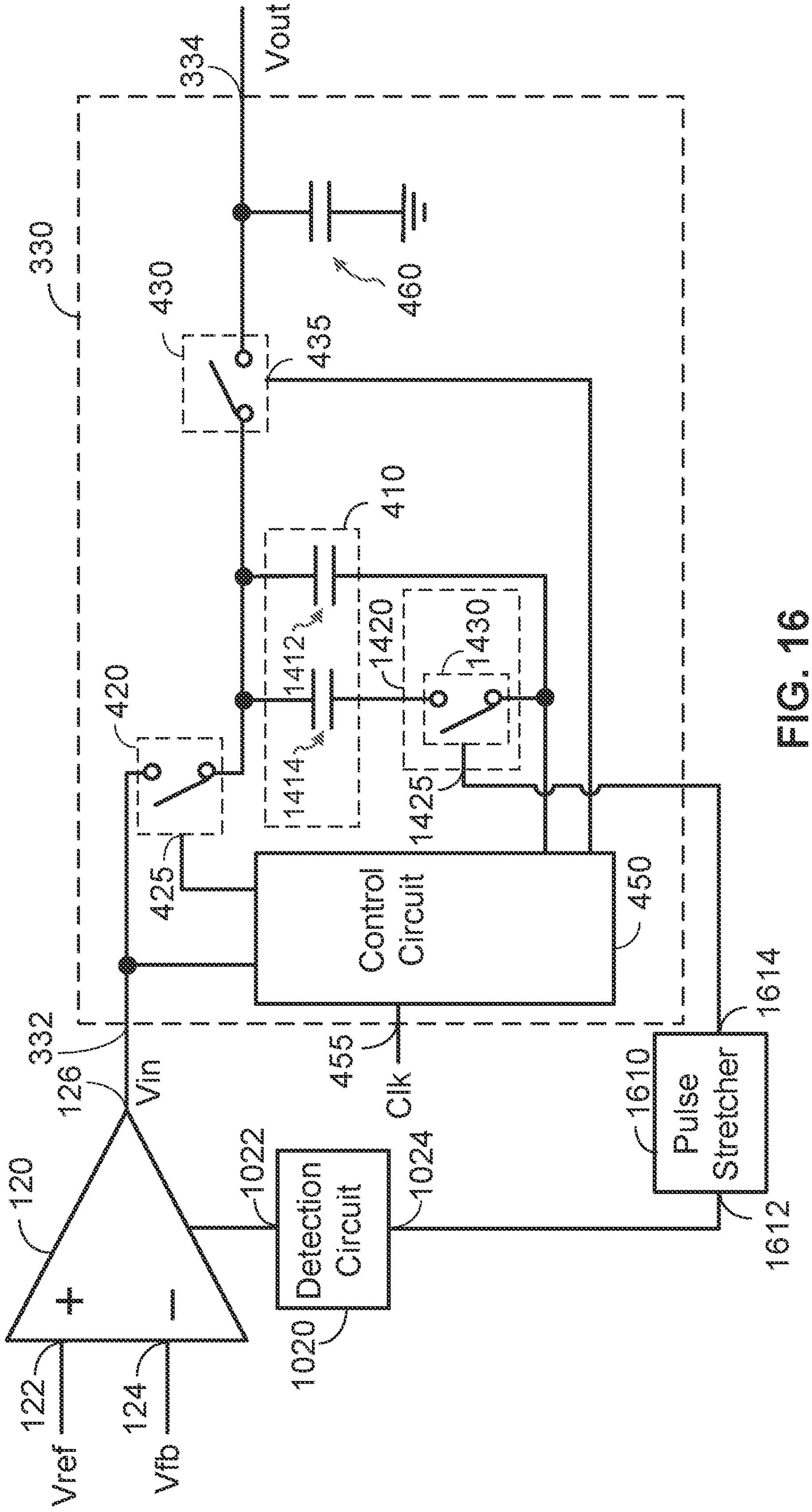
FIG. 16 shows an example of an LDO regulator including a pulse stretcher according certain aspects of the present disclosure.

FIG. 16 shows an example in which the LDO regulator 100 also includes a pulse stretcher 1610 coupled between the output 1024 of the detection circuit 1020 and the input 1425 of the capacitance controller 1420. The pulse stretcher 1610 has an input 1612 coupled to the output 1024 of the detection circuit 1020 and an output 1614 coupled to the input 1425 of the capacitance controller 1420.

When the detection circuit 1020 outputs the second logic value (e.g., one) to switch the capacitor 410 to the second capacitance, the pulse stretcher 1610 passes the second logic value to the input 1425 of the capacitance controller 1420. When the output 1024 of the detection circuit 1020 transitions from the second logic value (e.g., one) to the first logic value (e.g., zero), the output 1614 of the pulse stretcher 1610 transitions from the second logic value to the first logic value after a short delay. The delay causes the pulse stretcher 1610 to extend the amount of time that the second logic value (e.g., one) is output to the capacitance controller 1420 to sustain the fast response action (i.e., higher capacitance) a little longer without impacting the phase margin.

Figure 17:
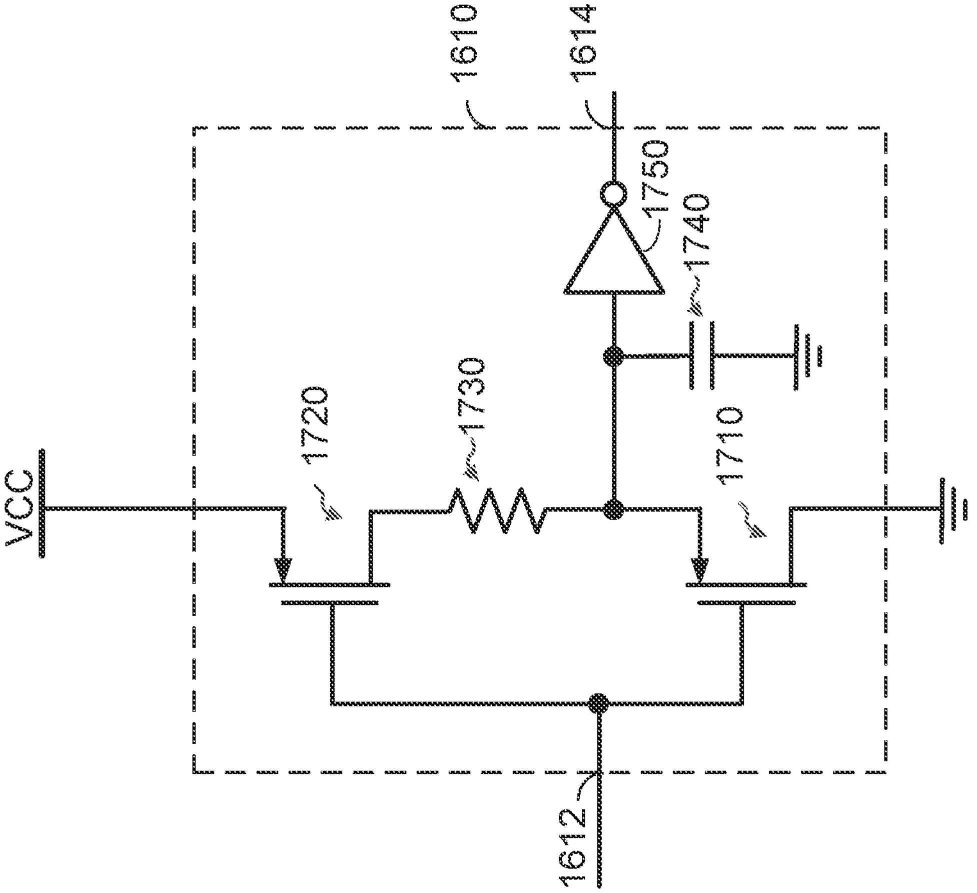
FIG. 17 shows an example implementation of the pulse stretching according to certain aspects of the present disclosure.

FIG. 17 shows an exemplary implementation of the pulse stretcher 1610 according to certain aspects. In this example, the pulse stretcher 1610 includes an NFET 1710, a PFET 1720, a resistor 1730, a capacitor 1740, and an inverter 1750. The source of the PFET 1720 is coupled to the supply rail and the gate of the PFET 1720 is coupled to the input 1612. The source of the NFET 1710 is coupled to ground and the gate of the NFET 1710 is coupled to the input 1612. The resistor 1730 is coupled between the drain of the PFET 1720 and the drain of the NFET 1710. The inverter 1750 is coupled between the drain of the NFET 1710 and the output 1614, and the capacitor 1740 is coupled between the drain of the NFET 1710 and ground.

In this example, the first logic value is zero and the second logic value is one. When the output 1024 of the detection circuit 1020 transitions from one to zero to switch the capacitor 410 to the first capacitance, the capacitor 1740 and the resistor 1730 delay the transition from one to zero at the output 1614 of the pulse stretcher 1610. This is because it takes time for the PFET 1720 to charge up the capacitor 1740 through the resistor 1730. Since the capacitor 1740 is coupled to the input of the inverter 1750, the time to charge up the capacitor 1740 delays the transition of the output of the inverter 1750 from one to zero, and hence delays the transition at the output 1614 of the pulse stretcher 1610 from one to zero.

Figure 18:
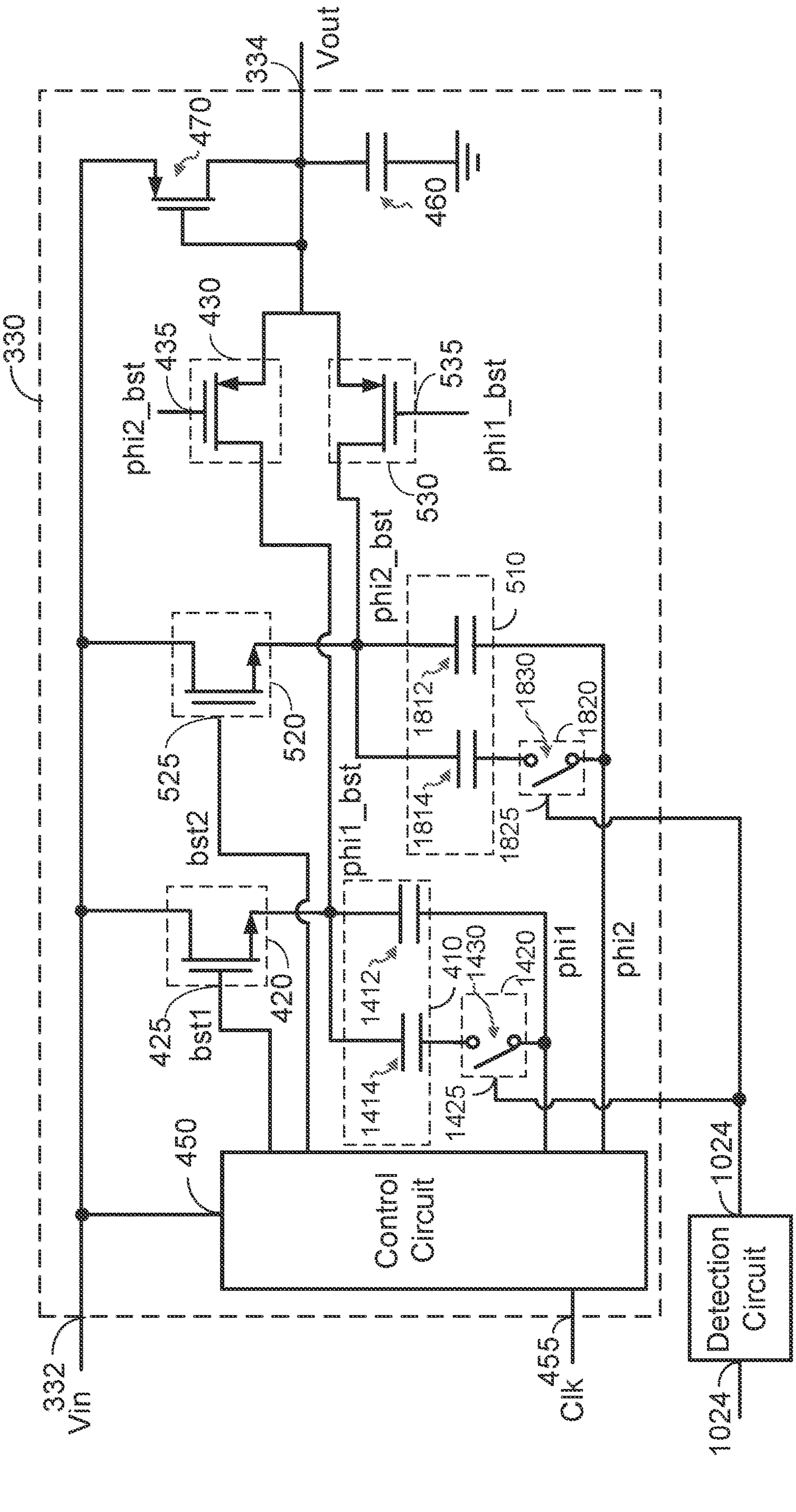
FIG. 18 shows an example of an LDO regulator including a first boost capacitor, a second boost capacitor, and a detection circuit configured to switch the capacitances of the first and second boost capacitors according certain aspects of the present disclosure.

Aspects of the present disclosure may be extended to the exemplary double charge pumping architecture shown in FIGS. 5, 6 and 8. In the regard, FIG. 18 shows an example in which the second capacitor 510 includes a third capacitor 1812 and a fourth capacitor 1814. The third capacitor 1812 may have approximately the same capacitance (e.g., C) as the first capacitor 1412, and the fourth capacitor 1814 may have approximately the same capacitance (e.g., nC) as the second capacitor 1414. However, it is to be appreciated that the present disclosure is not limited to this example.

In this example, the LDO regulator 100 includes a capacitance controller 1820 configured to switch the second capacitor 510 between a third capacitance and a fourth capacitance greater than the third capacitance. The third capacitance may be approximately equal to the first capacitance (e.g., C), and the fourth capacitance may be approximately equal to the second capacitance (e.g., C+nC). In the example shown in FIG. 18, the capacitance controller 1820 includes a switch 1830 coupled in series with the fourth capacitor 1814.

In this example, the top terminal of the third capacitor 1812 is coupled to the switches 520 and 530 and the bottom terminal of the third capacitor 1812 is coupled to the control circuit 450. The fourth capacitor 1814 and the switch 1830 are coupled in series between the switches 520 and 530 and the control circuit 450. In this example, the switch 1830 is opened to switch the second capacitor 510 to the third capacitance and closed to switch the second capacitor 510 to the fourth capacitance.

In this example, the detection circuit 1020 may cause the capacitance controllers 1420 and 1820 to switch the first capacitor 410 and the second capacitor 510 to the second capacitance and the fourth capacitance, respectively, when the detection circuit 1020 detects startup or a load transient. As discussed above, the detection circuit 1020 may detect the startup or the load transient by detecting the input differential voltage (i.e., difference between Vref and Vfb) of the amplifier 120 and detecting the startup or the load transient when the input differential voltage is greater than a threshold voltage. In the example in FIG. 18, the detection circuit 1020 may switch the first capacitor 410 to the second capacitance (e.g., C+nC) by closing the switch 1430, and switch the second capacitor 510 to the fourth capacitance (e.g., C+nC) by closing the switch 1830.

When the input different voltage is less than the threshold voltage, the detection circuit 1020 may cause the capacitance controllers 1420 and 1820 to switch the first capacitor 410 and the second capacitor 510 to the first capacitance (e.g., C) and the third capacitance (e.g., C), respectively. For example, the detection circuit 1020 may open the switch 1430 to switch the first capacitor 410 to the first capacitance, and open the switch 1830 to switch the second capacitor 510 to the third capacitance.

Although not shown in FIG. 18, it is to be appreciated that the LDO regulator 100 may include the pulse stretcher 1610 shown in FIG. 16. In this example, input 1612 of the pulse stretcher 1610 is coupled to the output 1024 of the detection circuit 1020, and the output 1614 of the pulse stretcher 1610 is coupled to the input 1425 of the capacitance controller 1420 for the first capacitor 410 and the input 1825 of the capacitance controller 1820 for the second capacitor 510.

Figure 19:
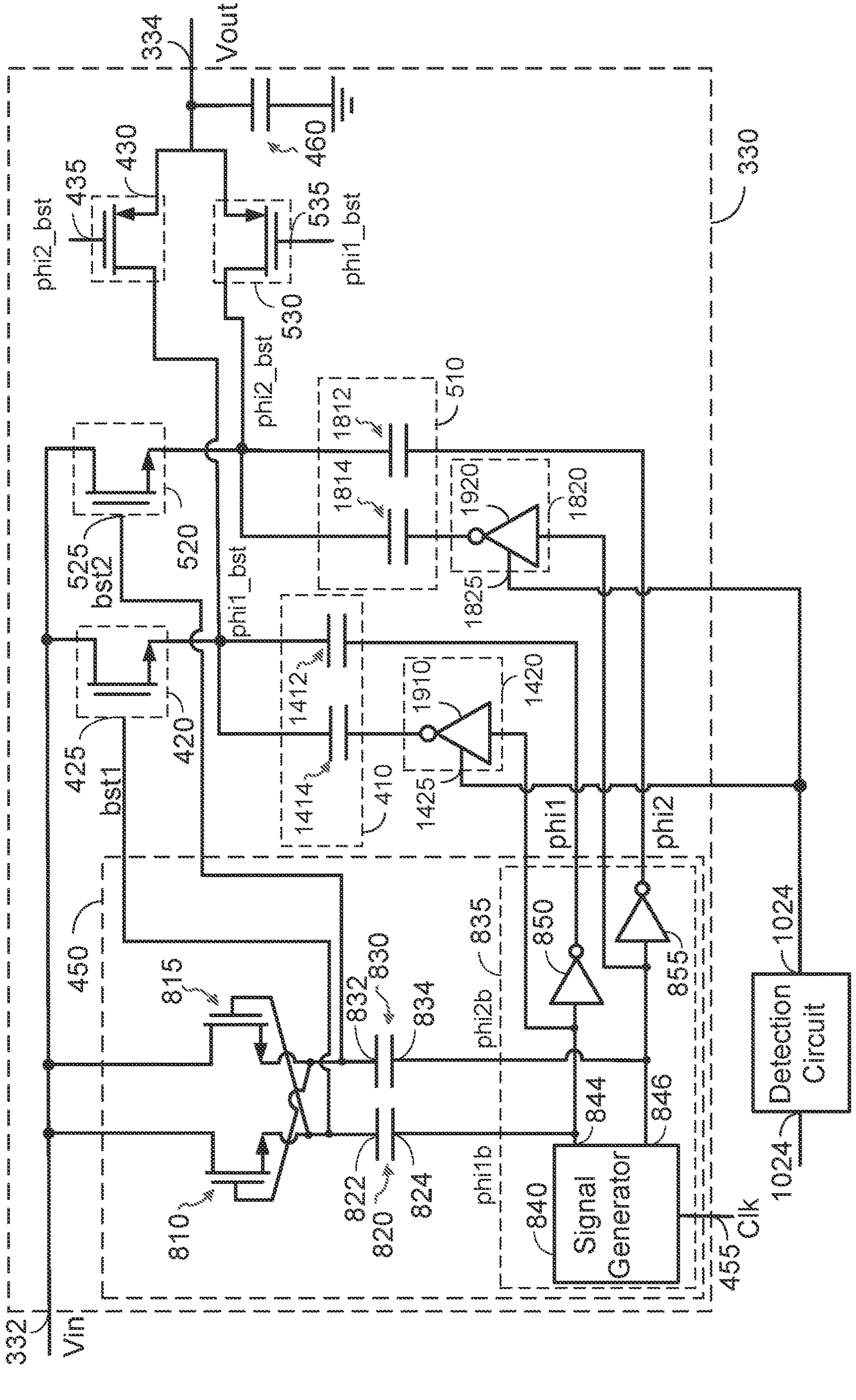
FIG. 19 shows another example of an LDO regulator including a first boost capacitor, a second boost capacitor, and a detection circuit configured to switch the capacitances of the first and second boost capacitors according certain aspects of the present disclosure.

FIG. 19 shows an exemplary implementation in which the capacitance controller 1420 includes a driver 1910. The output of the driver 1910 is coupled to the second capacitor 1414 and an enable/disable input of the driver 1910 is coupled to the input 1425 of the capacitance controller 1420. In the example shown in FIG. 19, the input of the driver 1910 is coupled to the first output 844 of the signal generator 840 and receives the control signal phi1*b* from the signal generator 840. However, it is to be appreciated that the present disclosure is not limited to this example. In the example shown in FIG. 19, the driver 1910 is implemented with a tri-state inverter. However, it is to be appreciated that the driver is not limited to this example. In this example, the driver 1910 may be disabled when the first logic value (e.g., zero) is input to the input 1425, and enabled when the second logic value (e.g., one) is input to the input 1425. However, it is to be appreciated that the driver 1910 is not limited to this example.

In this example, the detection circuit 1020 may switch the capacitor 410 to the first capacitance by disabling the driver 1910 (e.g., inputting the first logic value (e.g., zero) to the input 1425). In this case, the output impedance of the driver 1910 may be very high when the driver 1910 is disabled. The detection circuit 1020 may switch the capacitor 410 to the second capacitance by enabling the driver 1910 (e.g., inputting the second logic value (e.g., logic one) to the input 1425). In this case, the first inverter 850 drives the first capacitor 1412 and the driver 1910 drives the second capacitor 1414. For the example where the driver 1910 is implemented with a tri-state inverter, both the first inverter 850 and the driver 1910 invert the control signal phi1*b* to drive the first capacitor 1412 and the second capacitor 1414, respectively.

FIG. 19 shows an exemplary implementation in which the capacitance controller 1820 for the second capacitor 510 includes a driver 1920. The output of the driver 1920 is coupled to the fourth capacitor 1814 and an enable/disable input of the driver 1920 is coupled to the input 1825 of the capacitance controller 1820. In the example shown in FIG. 19, the input of the driver 1920 is coupled to the second output 846 of the signal generator 840 and receives the control signal phi2*b* from the signal generator 840. However, it is to be appreciated that the present disclosure is not limited to this example. In the example shown in FIG. 19, the driver 1920 is implemented with a tri-state inverter. However, it is to be appreciated that the driver is not limited to this example. In this example, the driver 1920 may be disabled when the first logic value (e.g., zero) is input to the input 1825, and enabled when the second logic value (e.g., one) is input to the input 1825.

In this example, the detection circuit 1020 may switch the second capacitor 510 to the third capacitance (e.g., C) by disabling the driver 1920. In this case, the output impedance of the driver 1920 may be very high when the driver 1920 is disabled. The detection circuit 1020 may switch the second capacitor 510 to the fourth capacitance (e.g., C+nC) by enabling the driver 1920. In this case, the second inverter 855 drives the third capacitor 1812 and the driver 1920 drives the fourth capacitor 1814. For the example where the driver 1920 is implemented with a tri-state inverter, both the second inverter 855 and the driver 1920 invert the control signal phi2*b* to drive the third capacitor 1812 and the fourth capacitor 1814, respectively.

Although not shown in FIG. 19, it is to be appreciated that the LDO regulator 100 may include the pulse stretcher 1610 shown in FIG. 16. In this example, input 1612 of the pulse stretcher 1610 is coupled to the output 1024 of the detection circuit 1020, and the output 1614 of the pulse stretcher 1610 is coupled to the input 1425 of the capacitance controller 1420 for the first capacitor 410 and the input 1825 of the capacitance controller 1820 for the second capacitor 510.

Figure 20:
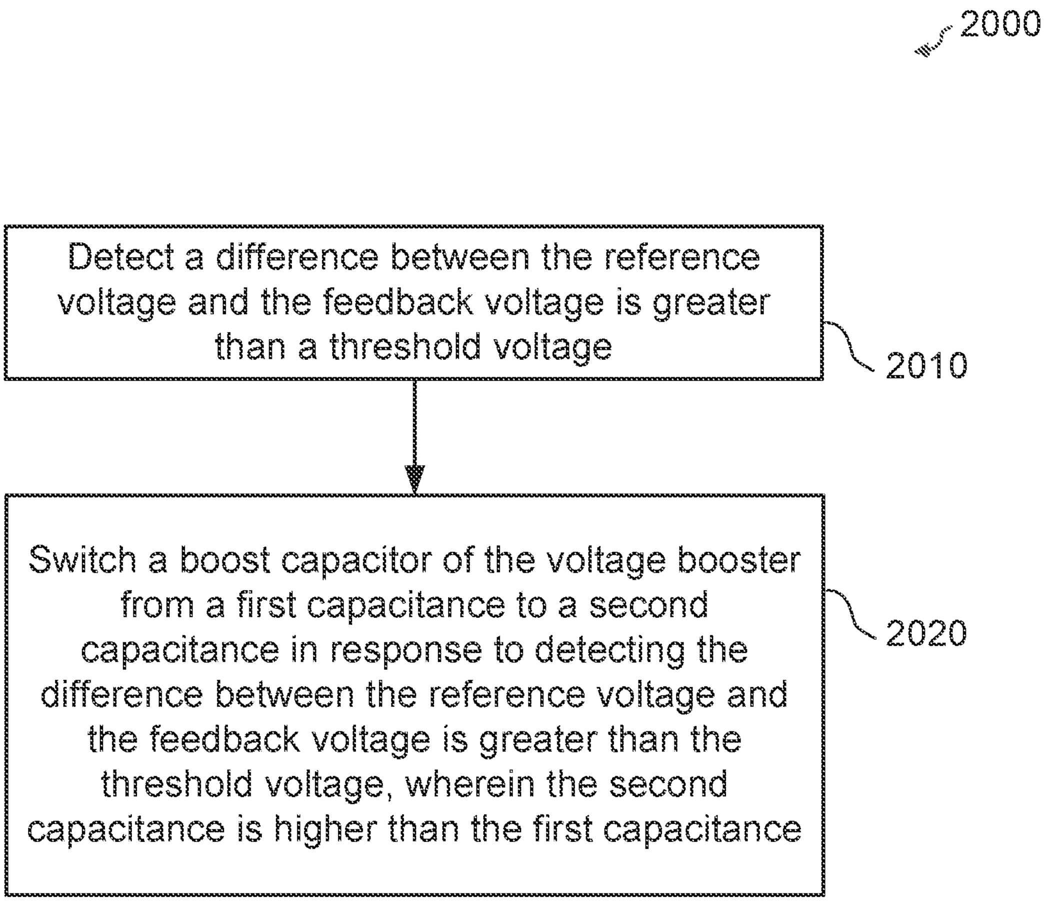
FIG. 20 is a flowchart illustrating another example of a method of operating a voltage regulator according to certain aspects of the present disclosure.

FIG. 20 illustrates a method 2000 of operating a voltage regulator (e.g., the LDO regulator 100) according to certain aspects. The voltage regulator includes a pass transistor (e.g., the pass NFET 115), an amplifier (e.g., the amplifier 120), and a voltage booster (e.g., the voltage booster 330) coupled between an output of the amplifier and a gate of the pass transistor, wherein a first input (e.g., first input 122) of the amplifier receives a reference voltage and a second input (e.g., second input 124) of the amplifier receives a feedback voltage via a feedback path (e.g., feedback path 150) coupled to a source of the pass transistor.

At block 2010, a difference between the reference voltage and the feedback voltage greater than a threshold voltage is detected. For example, the difference between the reference voltage and the feedback voltage may be detected by the detection circuit 1020. In this example, the voltage difference between the reference voltage and the feedback voltage being greater than the threshold voltage may indicate startup of the voltage regulator or a load transient.

At block 2020, a boost capacitor of the voltage booster is switched from a first capacitance to a second capacitance in response to detecting the difference between the reference voltage and the feedback voltage is greater than the threshold voltage, wherein the second capacitance is higher than the first capacitance. For example, the boost capacitator may correspond to capacitor 410, the first capacitance may correspond to the capacitance C, and the second capacitance may correspond to the capacitance C+nC (e.g., the combined capacitance of the first capacitor 1412 and the second capacitor 1414).

In certain aspects, the method 2000 may further include detecting the difference between the reference voltage and the feedback voltage is less than the threshold voltage, and switching the boost capacitor of the voltage booster from the second capacitance to the first capacitance in response to detecting the difference between the reference voltage and the feedback voltage is less than the threshold voltage.

Implementation examples are described in the following numbered clauses:

1. A voltage regulator, comprising:
   - a pass transistor coupled between an input of the voltage regulator and an output of the voltage regulator;
   - an amplifier having a first input, a second input, and an output, wherein the first input of the amplifier is configured to receive a reference voltage, and the second input of the amplifier is coupled to the output of the voltage regulator via a feedback path;
   - a voltage booster coupled between the output of the amplifier and a gate of the pass transistor;
   - a multiplexer having a first input, a second input, an output, and a select input, wherein the first input of the multiplexer is configured to receive a first clock signal, the second input of the multiplexer is configured to receive a second clock signal having a higher frequency than the first clock signal, and the output of the multiplexer is coupled to a clock input of the voltage booster; and a detection circuit having an input and an output, wherein the input of the detection circuit is coupled to the amplifier, and the output of the detection circuit is coupled to the select input of the multiplexer.

2. The voltage regulator of clause 1, wherein the voltage booster comprises a charge pump.

3. The voltage regulator of clause 1 or 2, wherein the detection circuit is configured to:

detect a difference between the reference voltage at the first input of the amplifier and a feedback voltage at the second input of the amplifier;

cause the multiplexer to select the second clock signal if the difference between the reference voltage and the feedback voltage is greater than a threshold voltage; and cause the multiplexer to select the first clock signal if the difference between the reference voltage and the feedback voltage is less than the threshold voltage.

4. The voltage regulator of clause 3, wherein the input of the detection circuit includes a first input coupled to the first input of the amplifier and a second input coupled to the second input of the amplifier.

5. The voltage regulator of clause 1 or 2, wherein:

the amplifier comprises an input stage configured to:

convert the reference voltage at the first input of the amplifier into a first current; and convert a feedback voltage at the second input of the amplifier into a second current; and the detection circuit comprises a current mirror configured to:

generate a pull-up current at the output of the detection circuit that is proportional to the first current by a first scaling factor; and generate a pull-down current at the output of the detection circuit that is proportional to the second current by a second scaling factor greater than the first scaling factor.

6. The voltage regulator of clause 5, wherein the multiplexer is configured to:

select the second clock signal if the output of the detection circuit is logic one; and select the first clock signal if the output of the detection circuit is logic zero.

7. The voltage regulator of clause 1 or 2, wherein amplifier comprises:

a first input transistor, wherein a gate of the first input transistor is coupled to the first input of the amplifier, and the first input transistor is configured to convert the reference voltage at the first input of the amplifier into a first current; and a second input transistor, wherein a gate of the second input transistor is coupled to the second input of the amplifier, and the second input transistor is configured to convert a feedback voltage at the second input of the amplifier into a second current.

8. The voltage regulator of clause 7, wherein the detection circuit comprises:

a first transistor, wherein a gate of the first transistor is coupled to a drain of the first input transistor, and a drain of the first transistor is coupled to the output of the detection circuit;

a second transistor, wherein a gate of the second transistor is coupled to a drain of the second input transistor;

a third transistor, wherein a drain of the third transistor is coupled to a drain of the second transistor, and a gate of the third transistor is coupled to the drain of the third transistor; and a fourth transistor, wherein a gate of the fourth transistor is coupled to the gate of the third transistor, a drain of the fourth transistor is coupled to the output of the detection circuit, a channel width of the fourth transistor is M times greater than a channel width of the first transistor, and M is greater than one.

9. The voltage regulator of any one of clauses 1 to 8, wherein the voltage booster is configured to double a voltage at the output of the amplifier to obtain a boosted voltage, and output the boosted voltage to the gate of the pass transistor.

10. The voltage regulator of any one of claims 1 to 9, wherein the voltage booster comprises:

a capacitor having a first terminal and a second terminal;

a first switch coupled between the output of the amplifier and the first terminal of the capacitor;

a second switch coupled between the first terminal of the capacitor and the gate of the pass transistor; and a control circuit coupled to the clock input of the voltage booster, a control input of the first switch, a control input of the second switch, and the second terminal of the capacitor.

11. The voltage regulator of clause 10, wherein the voltage booster further comprises an output capacitor coupled between the gate of the pass transistor and a ground.

12. The voltage regulator of clause 10 or 11, wherein, when the first clock signal is input to the voltage booster, the control circuit is configured to:

during a first phase of a period of the first clock signal, turn on the first switch, turn off the second switch, and couple the second terminal of the capacitor to a ground; and during a second phase of the period of the first clock signal, couple a voltage at the output of the amplifier to the second terminal of the capacitor, turn off the first switch, and turn on the second switch.

13. The voltage regulator of clause 12, wherein, when the second clock signal is input to the voltage booster, the control circuit is configured to:

during a first phase of a period of the second clock signal, turn on the first switch, turn off the second switch, and couple the second terminal of the capacitor to the ground; and during a second phase of the period of the second clock signal, couple the voltage at the output of the amplifier to the second terminal of the capacitor, turn off the first switch, and turn on the second switch.

14. The voltage regulator of any one of clauses 1 to 13, wherein the pass transistor comprises an n-type field effect transistor (NFET).

15. A method of operating a voltage regulator, wherein the voltage regulator includes a pass transistor, an amplifier, and a voltage booster coupled between an output of the amplifier and a gate of the pass transistor, wherein a first input of the amplifier receives a reference voltage and a second input of the amplifier receives a feedback voltage via a feedback path coupled to a source of the pass transistor, the method comprising:

detecting a difference between the reference voltage and the feedback voltage is greater than a threshold voltage; and switching a clock input of the voltage booster from a first clock signal to a second clock signal in response to detecting the difference between the reference voltage and the feedback voltage is greater than the threshold voltage, wherein the second clock signal has a higher clock frequency than the first clock signal.

16. The method of clause 15, further comprising:
detecting the difference between the reference voltage and the feedback voltage is less than the threshold voltage; and
switching the clock input of the voltage booster from the second clock signal to the first clock signal in response to detecting the difference between the reference voltage and the feedback voltage is less than the threshold voltage.

17. A voltage regulator, comprising:
a pass transistor coupled between an input of the voltage regulator and an output of the voltage regulator;
an amplifier having a first input, a second input, and an output, wherein the first input of the amplifier is configured to receive a reference voltage, and the second input of the amplifier is coupled to the output of the voltage regulator via a feedback path;
a voltage booster coupled between the output of the amplifier and a gate of the pass transistor, wherein the voltage booster includes a boost capacitor and an output capacitor, the output capacitor is coupled to the gate of the pass transistor, and the voltage booster is configured to:
during a first phase, charge the boost capacitor with current from the output of the amplifier; and
during a second phase, boost a voltage on the boost capacitor and transfer charge from the boost capacitor to the output capacitor;
a capacitance controller configured to switch the boost capacitor between a first capacitance and a second capacitance higher than the first capacitance; and
a detection circuit having an input and an output, wherein the input of the detection circuit is coupled to the amplifier, and the output of the detection circuit is coupled to the capacitance controller.

18. The voltage regulator of clause 17, wherein the detection circuit is configured to:
detect a difference between the reference voltage at the first input of the amplifier and a feedback voltage at the second input of the amplifier;
cause the capacitance controller to switch the boost capacitor to the second capacitance if the difference between the reference voltage and the feedback voltage is greater than a threshold voltage; and
cause the capacitance controller to switch the boost capacitor to the first capacitance if the difference between the reference voltage and the feedback voltage is less than the threshold voltage.

19. The voltage regulator of clause 18, wherein the input of the detection circuit includes a first input coupled to the first input of the amplifier and a second input coupled to the second input of the amplifier.

20. The voltage regulator of clause 17, wherein:
the amplifier comprises an input stage configured to:
convert the reference voltage at the first input of the amplifier into a first current; and
convert a feedback voltage at the second input of the amplifier into a second current; and
the detection circuit comprises a current mirror configured to:
generate a pull-up current at the output of the detection circuit that is proportional to the first current by a first scaling factor; and
generate a pull-down current at the output of the detection circuit that is proportional to the second current by a second scaling factor greater than the first scaling factor.

21. The voltage regulator of clause 20, wherein the capacitance controller is configured to:
switch the boost capacitor to the second capacitance if the output of the detection circuit is logic one; and
switch the boost capacitor to the first capacitance if the output of the detection circuit is logic zero.

22. The voltage regulator of any one of clauses 17 to 21, wherein:
the boost capacitor includes a first capacitor and a second capacitor; and
the capacitance controller comprises a switch coupled in series with the second capacitor.

23. The voltage regulator of clause 22, wherein the first capacitance is equal to a capacitance of the first capacitor, and the second capacitance is equal to a sum of the capacitance of the first capacitor and a capacitance of the second capacitor.

24. The voltage regulator of clause 22 or 23, wherein the detection circuit is configured to open the switch to switch the boost capacitor to the first capacitance and close the switch to switch the boost capacitor to the second capacitance.

25. The voltage regulator of any one of clauses 17 to 21, wherein:
the boost capacitor includes a first capacitor and a second capacitor; and
the capacitance controller comprises a driver coupled to the second capacitor.

26. The voltage regulator of clause 25, wherein the detection circuit is configured to disable the driver to switch the boost capacitor to the first capacitance and enable the driver to switch the boost capacitor to the second capacitance.

27. The voltage regulator of clause 25 or 26, wherein the driver comprises a tri-state inverter.

28. The voltage regulator of any one of clauses 17 to 27, further comprising a pulse stretcher coupled between the detection circuit and the capacitance controller.

29. The voltage regulator of any one of clauses 17 to 28, wherein the pass transistor comprises an n-type field effect transistor (NFET).

30. A method of operating a voltage regulator, wherein the voltage regulator includes a pass transistor, an amplifier, and a voltage booster coupled between an output of the amplifier and a gate of the pass transistor, wherein a first input of the amplifier receives a reference voltage and a second input of the amplifier receives a feedback voltage via a feedback path coupled to a source of the pass transistor, the method comprising:
detecting a difference between the reference voltage and the feedback voltage is greater than a threshold voltage; and
switching a boost capacitor of the voltage booster from a first capacitance to a second capacitance in response to detecting the difference between the reference voltage and the feedback voltage is greater than the threshold voltage, wherein the second capacitance is higher than the first capacitance.

31. The method of clause 30, further comprising:
detecting the difference between the reference voltage and the feedback voltage is less than the threshold voltage; and
switching the boost capacitor of the voltage booster from the second capacitance to the first capacitance in response to detecting the difference between the reference voltage and the feedback voltage is less than the threshold voltage.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "approximately", as used herein with respect to a stated value or a property, is intended to indicate being within 10% of the stated value or property (i.e., between 90% to 110% of the stated value or property).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A voltage regulator, comprising:
a pass transistor coupled between an input of the voltage regulator and an output of the voltage regulator;
an amplifier having a first input, a second input, and an output, wherein the first input of the amplifier is configured to receive a reference voltage, and the second input of the amplifier is coupled to the output of the voltage regulator via a feedback path;
a voltage booster coupled between the output of the amplifier and a gate of the pass transistor, wherein the voltage booster comprises a charge pump;
a multiplexer having a first input, a second input, an output, and a select input, wherein the first input of the multiplexer is configured to receive a first clock signal, the second input of the multiplexer is configured to receive a second clock signal having a higher frequency than the first clock signal, and the output of the multiplexer is coupled to a clock input of the voltage booster; and
a detection circuit having an input and an output, wherein the input of the detection circuit is coupled to the amplifier, and the output of the detection circuit is coupled to the select input of the multiplexer, wherein the detection circuit is configured to
detect a difference between the reference voltage at the first input of the amplifier and a feedback voltage at the second input of the amplifier,
cause the multiplexer to select the second clock signal if the difference between the reference voltage and the feedback voltage is greater than a threshold voltage, and
cause the multiplexer to select the first clock signal if the difference between the reference voltage and the feedback voltage is less than the threshold voltage.

2. The voltage regulator of claim 1, wherein:
the amplifier comprises an input stage configured to:
convert the reference voltage at the first input of the amplifier into a first current; and
convert a feedback voltage at the second input of the amplifier into a second current; and
the detection circuit comprises a current mirror configured to:
generate a pull-up current at the output of the detection circuit that is proportional to the first current by a first scaling factor; and
generate a pull-down current at the output of the detection circuit that is proportional to the second current by a second scaling factor greater than the first scaling factor.

3. The voltage regulator of claim 2, wherein the multiplexer is configured to:
select the second clock signal if the output of the detection circuit is logic one; and
select the first clock signal if the output of the detection circuit is logic zero.

4. A voltage regulator, comprising:
a pass transistor coupled between an input of the voltage regulator and an output of the voltage regulator;
an amplifier having a first input, a second input, and an output, wherein the first input of the amplifier is configured to receive a reference voltage, and the second input of the amplifier is coupled to the output of the voltage regulator via a feedback path;
a voltage booster coupled between the output of the amplifier and a gate of the pass transistor, wherein the voltage booster comprises
a capacitor having a first terminal and a second terminal,
a first switch coupled between the output of the amplifier and the first terminal of the capacitor,
a second switch coupled between the first terminal of the capacitor and the gate of the pass transistor, and
a control circuit coupled to a clock input of the voltage booster, a control input of the first switch, a control input of the second switch, and the second terminal of the capacitor;
a multiplexer having a first input, a second input, an output, and a select input, wherein the first input of the multiplexer is configured to receive a first clock signal, the second input of the multiplexer is configured to receive a second clock signal having a higher frequency than the first clock signal, and the output of the multiplexer is coupled to the clock input of the voltage booster; and
a detection circuit having an input and an output, wherein the input of the detection circuit is coupled to the amplifier, and the output of the detection circuit is coupled to the select input of the multiplexer,
wherein, when the first clock signal is input to the voltage booster, the control circuit is configured to:
during a first phase of a period of the first clock signal, turn on the first switch, turn off the second switch, and couple the second terminal of the capacitor to a ground; and during a second phase of the period of the first clock signal, couple a voltage at the output of the amplifier to the second terminal of the capacitor, turn off the first switch, and turn on the second switch.

5. The voltage regulator of claim 4, wherein, when the second clock signal is input to the voltage booster, the control circuit is configured to:

during a first phase of a period of the second clock signal, turn on the first switch, turn off the second switch, and couple the second terminal of the capacitor to the ground; and during a second phase of the period of the second clock signal, couple the voltage at the output of the amplifier to the second terminal of the capacitor, turn off the first switch, and turn on the second switch.

6. A voltage regulator, comprising:

a pass transistor coupled between an input of the voltage regulator and an output of the voltage regulator;

an amplifier having a first input, a second input, and an output, wherein the first input of the amplifier is configured to receive a reference voltage, and the second input of the amplifier is coupled to the output of the voltage regulator via a feedback path;

a voltage booster coupled between the output of the amplifier and a gate of the pass transistor, wherein the voltage booster includes a boost capacitor and an output capacitor, the output capacitor is coupled to the gate of the pass transistor, and the voltage booster is configured to:

during a first phase, charge the boost capacitor with current from the output of the amplifier; and during a second phase, boost a voltage on the boost capacitor and transfer charge from the boost capacitor to the output capacitor;

a capacitance controller configured to switch the boost capacitor between a first capacitance and a second capacitance higher than the first capacitance; and a detection circuit having an input and an output, wherein the input of the detection circuit is coupled to the amplifier, and the output of the detection circuit is coupled to the capacitance controller, wherein the detection circuit is configured to detect a difference between the reference voltage at the first input of the amplifier and a feedback voltage at the second input of the amplifier, cause the capacitance controller to switch the boost capacitor to the second capacitance if the difference between the reference voltage and the feedback voltage is greater than a threshold voltage, and cause the capacitance controller to switch the boost capacitor to the first capacitance if the difference between the reference voltage and the feedback voltage is less than the threshold voltage.

7. The voltage regulator of claim 6, wherein:

the amplifier comprises an input stage configured to:

convert the reference voltage at the first input of the amplifier into a first current; and convert a feedback voltage at the second input of the amplifier into a second current; and the detection circuit comprises a current mirror configured to:

generate a pull-up current at the output of the detection circuit that is proportional to the first current by a first scaling factor; and generate a pull-down current at the output of the detection circuit that is proportional to the second current by a second scaling factor greater than the first scaling factor.

8. The voltage regulator of claim 7, wherein the capacitance controller is configured to:

switch the boost capacitor to the second capacitance if the output of the detection circuit is logic one; and switch the boost capacitor to the first capacitance if the output of the detection circuit is logic zero.

9. The voltage regulator of claim 6, wherein:

the boost capacitor includes a first capacitor and a second capacitor; and the capacitance controller comprises a switch coupled in series with the second capacitor.

10. The voltage regulator of claim 9, wherein the first capacitance is equal to a capacitance of the first capacitor, and the second capacitance is equal to a sum of the capacitance of the first capacitor and a capacitance of the second capacitor.

11. The voltage regulator of claim 9, wherein the detection circuit is configured to open the switch to switch the boost capacitor to the first capacitance and close the switch to switch the boost capacitor to the second capacitance.

12. The voltage regulator of claim 6, wherein:

the boost capacitor includes a first capacitor and a second capacitor; and the capacitance controller comprises a driver coupled to the second capacitor.

13. The voltage regulator of claim 12, wherein the detection circuit is configured to disable the driver to switch the boost capacitor to the first capacitance and enable the driver to switch the boost capacitor to the second capacitance.

14. The voltage regulator of claim 6, wherein the pass transistor comprises an n-type field effect transistor (NFET).

* * * * *